US005703714A

United States Patent [19]
Kojima

[11] Patent Number: 5,703,714
[45] Date of Patent: Dec. 30, 1997

[54] MICROSCOPE SYSTEM FOR CONTROLLING OPTICAL ELEMENTS IN INTERLOCK WITH A VARIATION IN OBSERVATION CONDITIONS

[75] Inventor: Jitsunari Kojima, Akiruno, Japan

[73] Assignee: Olympus Optical Co., Ltd., Tokyo, Japan

[21] Appl. No.: 592,448

[22] Filed: Jan. 26, 1996

[30] Foreign Application Priority Data

Feb. 2, 1995 [JP] Japan ................................. 7-015812

[51] Int. Cl.$^6$ .............................. G02B 21/00; G02B 21/06
[52] U.S. Cl. .......................... 359/368; 359/381; 359/388; 359/363; 250/201.3; 348/79; 364/525
[58] Field of Search ...................... 359/363, 368, 359/381, 388; 250/201.3; 348/79; 364/525, 413.08; 358/453

[56] References Cited

U.S. PATENT DOCUMENTS

| | | |
|---|---|---|
| 4,643,540 | 2/1987 | Kawasaki . |
| 4,661,692 | 4/1987 | Kawasaki . |
| 5,239,171 | 8/1993 | Takabayashi et al. ............... 359/388 |
| 5,517,353 | 5/1996 | Ikoh et al. ........................... 359/388 |

FOREIGN PATENT DOCUMENTS

| | | |
|---|---|---|
| 63-133115 | 6/1988 | Japan . |
| 5-16006 | 3/1993 | Japan . |
| 5-16565 | 3/1993 | Japan . |
| 5-16566 | 3/1993 | Japan . |
| 5-113589 | 5/1993 | Japan . |

*Primary Examiner*—Jon W. Henry
*Attorney, Agent, or Firm*—Frishauf, Holtz, Goodman, Langer & Chick

[57] ABSTRACT

A microscope apparatus includes a light source for generating illumination light, an illumination optical system for illuminating an object to be observed with the illumination light, and an observation optical system for conducting an observation image of the illuminated object to an observation site. An objective change unit is arranged in the observation optical system for holding a plurality of objectives and for selectively inserting one of the objectives onto an optical path of the observation optical system. An optical system controller, which independently controls an optical element arranged in the illumination optical system and independently controls an optical element arranged in the observation optical system, includes a frame controller for controlling the objective change unit to insert one of the plurality of objectives selected onto the optical path of the observation optical system. A recognition unit recognizes one of a plurality of predetermined observation methods designated by the observer. A memory has a table for registering setting conditions of the optical elements which correspond to the respective observation methods, and fit/unfit information indicating whether or not each of the plurality of objectives is fit for the respective observation methods. A fit determination module operates in accordance with the fit/unfit information registered in the table of the memory for: (i) when the observer designates the observation method, determining whether or not the designated observation method is fit for the selected objective, and (ii) when the observer selects the objective, determining whether or not the selected objective is fit for the designated observation method.

24 Claims, 31 Drawing Sheets

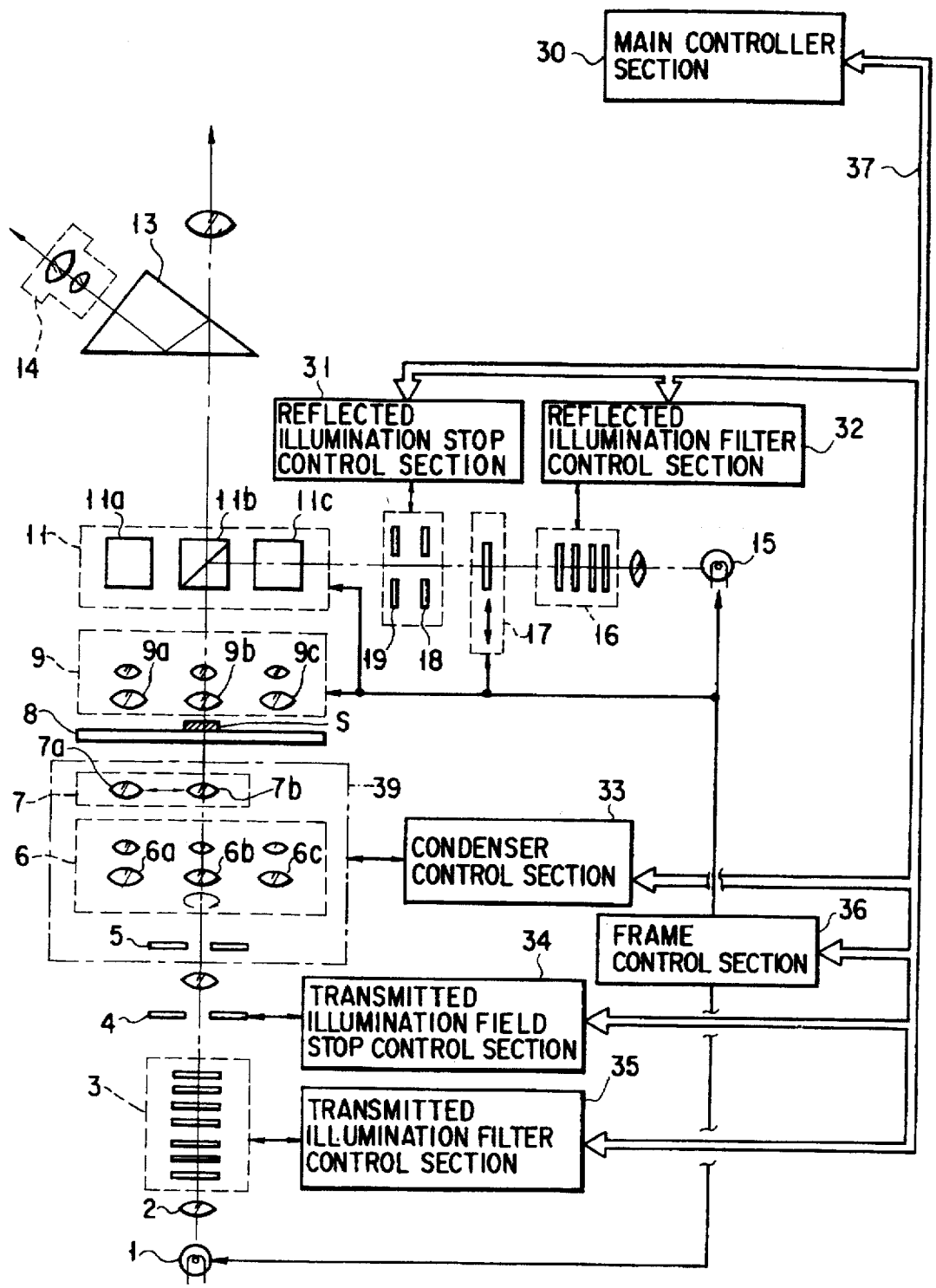
F I G. 1

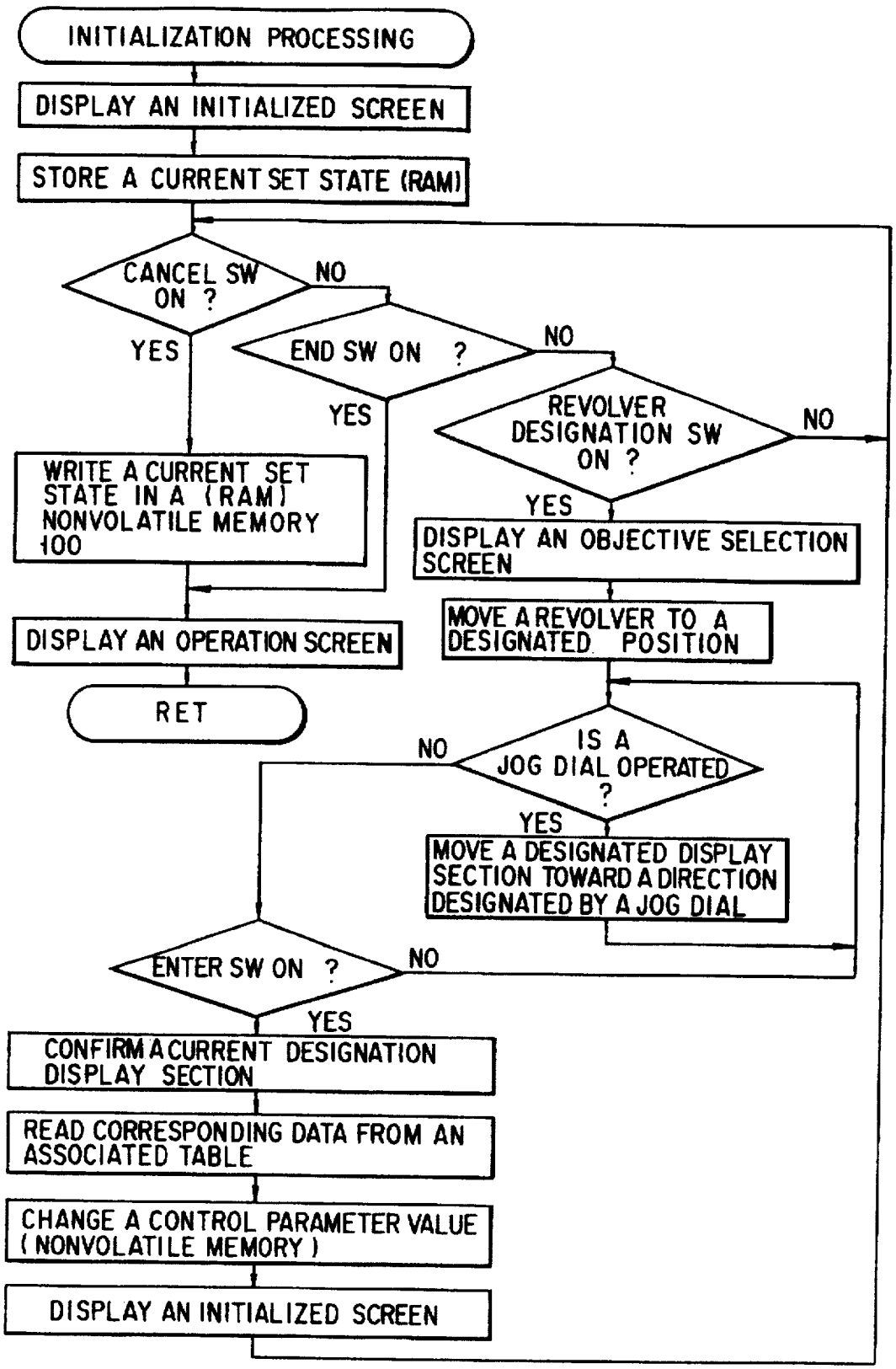
F I G. 7

OBJECTIVE PARAMETER TABLE

| | | | | | | | | | | |
|---|---|---|---|---|---|---|---|---|---|---|
| AVAILABLE REFLECTED ILLUMINATION OBSERVATION METHOD | FLUORESCENCE MICROSCOPY | × | × | ○ | ○ | ○ | ○ | ○ | ○ | ○ |
| | DARK FIELD MICROSCOPY | × | × | × | × | × | × | × | ○ | ○ |
| | BRIGHT FIELD MICROSCOPY | × | × | × | × | × | × | × | ○ | ○ |
| AVAILABLE TRANSMITTED ILLUMINATION OBSERVATION METHOD | PHASE CONTRAST MICROSCOPY | × | × | × | × | × | × | ○ | ○ | ○ |
| | DIFFERENTIAL INTERFERENCE MICROSCOPY | × | × | ○ | ○ | ○ | ○ | ○ | ○ | ○ |
| | DARK FIELD MICROSCOPY | ○ | ○ | ○ | ○ | ○ | ○ | ○ | ○ | ○ |
| | BRIGHT FIELD MICROSCOPY | ○ | ○ | ○ | ○ | ○ | ○ | ○ | ○ | ○ |
| BRIGHTNESS COEFFICIENT $\log_a OB$ | | -2 | 0 | 0 | -1 | -13 | -3 | -5 | -8 | |
| FOCAL DISTANCE $OBf$ | | 144.00 | 90.00 | 45.00 | 18.00 | 9.00 | 4.50 | 18.00 | 9.00 | 4.50 |
| NUMERICAL APERTURE $OBna$ | | 0.04 | 0.08 | 0.16 | 0.40 | 0.70 | 0.85 | 0.30 | 0.50 | 0.75 |
| MAGNIFICATION $OBmag$ | | 1.25 | 2 | 4 | 10 | 20 | 40 | 10 | 20 | 40 |
| KINDS OF OBJECTIVES $OBtype$ | | Plan Apo | Plan Apo | UPLan Apo | UPLan Apo | UPLan Apo | UPLan Apo | UPLan FL | UPLan FL | UPLan FL |
| NO. | | 1 | 2 | 3 | 4 | 5 | 6 | 7 | 8 | 9 |

○ : AVAILABLE   × : UNAVAILABLE

FIG. 13

| OBSERVATION METHOD \ ITEM | TRANSMITTED ILLUMINATION OBSERVATION METHOD | | | | REFLECTED ILLUMINATION OBSERVATION METHOD | | |
|---|---|---|---|---|---|---|---|
| | BRIGHT FIELD MICROSCOPY | DARK FIELD MICROSCOPY | DIFFERENTIAL INTERFERENCE MICROSCOPY | PHASE CONTRAST MICROSCOPY | BRIGHT FIELD MICROSCOPY | DARK FIELD MICROSCOPY | FLUORESCENCE MICROSCOPY |
| FIELD STOP (FS) | 100 % | OPEN DIAMETER | 100 % | 100 % | 100 % | OPEN DIAMETER | 100 % |
| APERTURE STOP (AS) | 80 % | OPEN DIAMETER | 80 % | OPEN DIAMETER | 80 % | OPEN DIAMETER | 100 % |
| PER-OBSERVATION METHOD BRIGHTNESS CORRECTION VALUE (Kk) | 1 | 1/256 | 1/8 | 1/256 | 0 | 1/256 | 1/1024 |

| | | | | Observation Method | Transmitted Observation | Transmitted Illumination Method | | | Reflected Illumination Observation Method | | | Kind of Top Lens |
|---|---|---|---|---|---|---|---|---|---|---|---|---|
| | | | | | Bright Field Microscopy | Dark Field Microscopy | Differential Interference Microscopy | Phase Contrast Microscopy | Bright Field Microscopy | Dark Field Microscopy | Fluorescence Microscopy (×: unavailable) | |
| Revolver Position No. | Control Parameter OBmag | OBna | Brightness Coefficient $\log\alpha_{OB}$ | Item | | | | | | | | |
| 1 | 4 | 0.16 | 0 | Field Stop (Kfs) / Aperture Stop (Kas) | 1.0 / 0.64 | × / × | × / × | × / × | × / × | × / × | × / × | Low Power |
| 2 | 10 | 0.40 | −1 | Field Stop (Kfs) / Aperture Stop (Kas) | 1.0 / 0.64 | ∞ / ∞ | 1.0 / 0.64 | 1.0 / 0.64 | 1.0 / 0.64 | ∞ / ∞ | 1.0 / 1.0 | High Power |
| 3 | 20 | 0.70 | −5 | Field Stop (Kfs) / Aperture Stop (Kas) | 1.0 / 0.64 | ∞ / ∞ | 1.0 / 0.64 | 1.0 / ∞ | 1.0 / 0.64 | ∞ / ∞ | 1.0 / 1.0 | High Power |
| 4 | 40 | 0.85 | −13 | Field Stop (Kfs) / Aperture Stop (Kas) | 1.0 / 0.64 | ∞ / ∞ | 1.0 / 0.64 | 1.0 / ∞ | 1.0 / 0.64 | ∞ / ∞ | 1.0 / 1.0 | High Power |
| 5 | 60 | 0.85 | −11 | Field Stop (Kfs) / Aperture Stop (Kas) | 1.0 / 0.64 | ∞ / ∞ | 1.0 / 0.64 | 1.0 / ∞ | 1.0 / 0.64 | ∞ / ∞ | 1.0 / 1.0 | High Power |
| 6 | 2 | 0.08 | 0 | Field Stop (Kfs) / Aperture Stop (Kas) | 1.0 / 0.64 | × / × | × / × | × / × | × / × | × / × | × / × | Low Power |
| Brightness Correction Value for Each Observation Method ($\log\alpha_{Kk}$) | | | | | 0 / 0 | −32 / 0 | −12 / 0 | −32 / 0 | −32 / 0 | −32 / 0 | −40 / 0 | |
| Illumination Light Source Lamp Voltage (Lvol) | | | | | 9.0 | 9.0 | 9.0 | 9.0 | 9.0 | 9.0 | 9.0 | |

Legend:
- Objective Magnification OBmag — Bright Field Microscopy
- Numerical Aperture OBna — Dark Field Microscopy
- Brightness Coefficient $\log\alpha_{OB}$ — Differential Interference Microscopy
- Manual Correction Coefficient

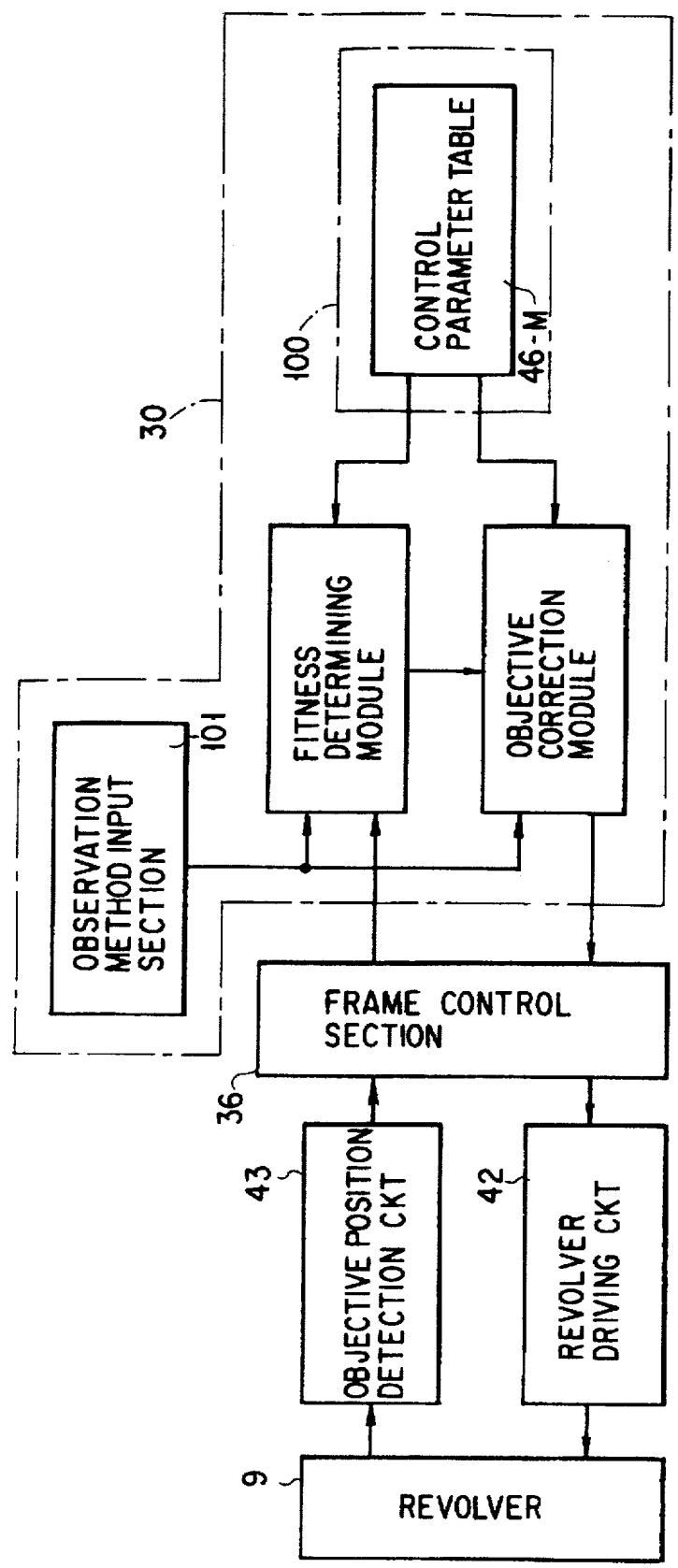
F I G. 16

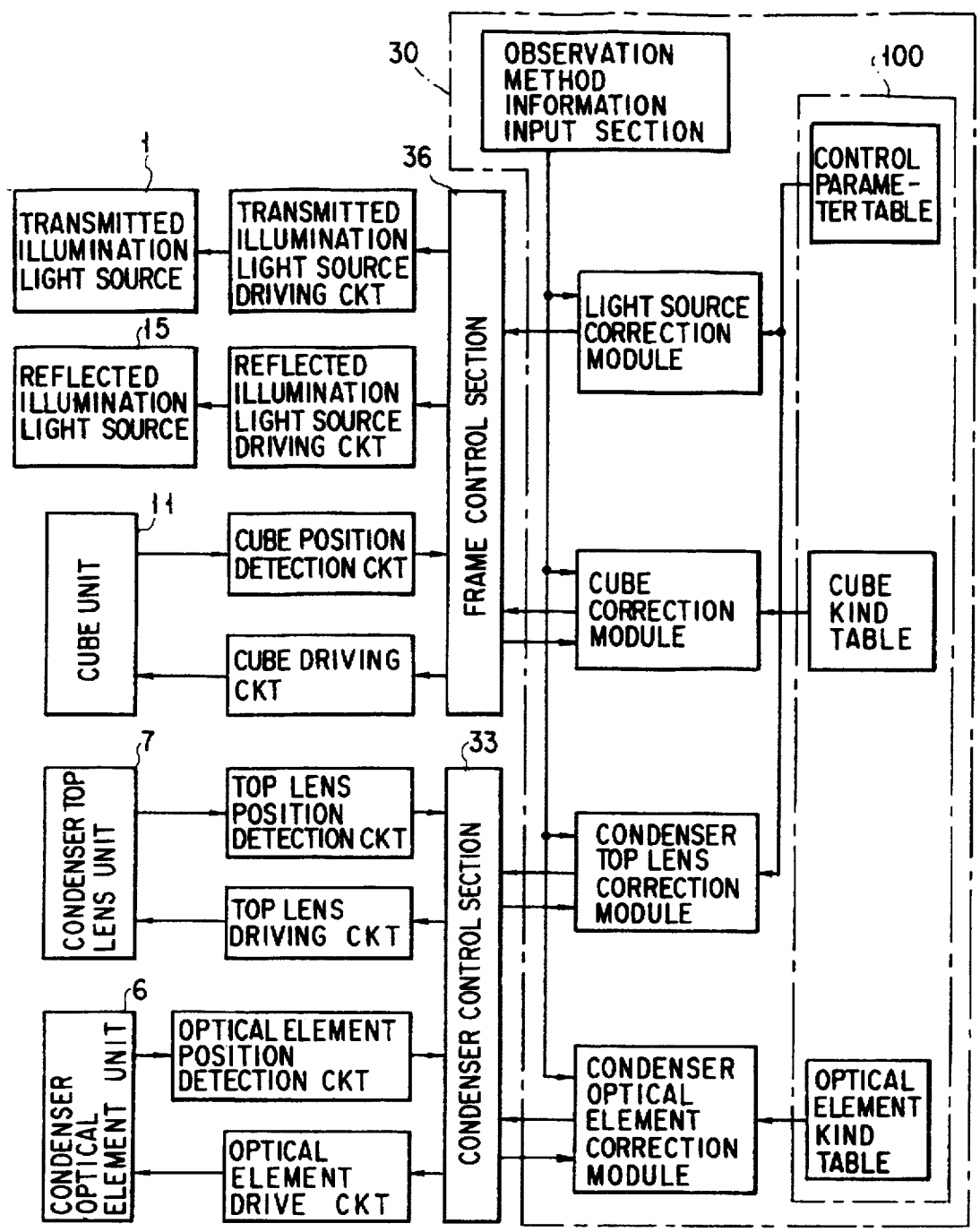
F I G. 17

| CUBE POSITION | KINDS OF CUBES (No. IN FIGURES) |
|---|---|
| 1 | REFLECTED BRIGHT FIELD ILLUMINATION CUBE (11a) |
| 2 | REFLECTED BRIGHT FIELD ILLUMINATION CUBE (11b) |
| 3 | REFLECTED BRIGHT FIELD ILLUMINATION CUBE (11c) |
| 4 | EMPTY HOLE |

F I G. 18

| OPTICAL ELEMENT POSITION | KINDS OF OPTICAL ELEMENTS (No. IN FIGURES) |
|---|---|
| 1 | TRANSMITTED DARK FIELD ILLUMINATION OPTICAL ELEMENT (6a) |
| 2 | TRANSMITTED DARK FIELD ILLUMINATION OPTICAL ELEMENT (6b) |
| 3 | TRANSMITTED DARK FIELD ILLUMINATION OPTICAL ELEMENT (6c) |
| 4 | EMPTY HOLE |
| 5 | EMPTY HOLE |
| 6 | EMPTY HOLE |

| LIGHT AMOUNT RATIO | ND COEFFICIENT |
|---|---|
| 1 | $\geq logaND \geq -2$ |
| 1/2 | $-2 \geq logaND \geq -6$ |
| 1/4 | $-6 \geq logaND \geq -10$ |
| 1/8 | $-10 \geq logaND \geq -14$ |
| 1/16 | $-14 \geq logaND \geq -18$ |
| 1/32 | $-18 \geq logaND \geq -22$ |
| 1/64 | $-22 \geq logaND \geq -26$ |
| 1/128 | $-26 \geq logaND \geq -30$ |
| 1/256 | $-30 \geq logaND \geq -34$ |
| 1/512 | $-34 \geq logaND \geq -38$ |
| 1/1024 | $-38 \geq logaND \geq -42$ |
| 1/2048 | $-42 \geq logaND \geq -46$ |
| 1/4096 | $-46 \geq logaND \geq -50$ |
| 1/8192 | $-50 \geq logaND \geq$ |

FIG. 21

| FILTER POSITION | KINDS OF FILTER |
|---|---|
| No.1 | ND 50 |
| No.2 | ND 25 |
| No.3 | ND 6 |
| No.4 | ND 1.5 |
| No.5 | COLOR TEMPERATURE CORRECTION FILTER |
| No.6 | CONTRAST ENHANCED FILTER |
| No.7 | SPECIFIC COLOR ENHANCED FILTER |

FIG. 22

| | No.1 (ND50) | No.2 (ND25) | No.3 (ND6) | No.4 (ND1.5) | LIGHT AMOUNT RATIO |
|---|---|---|---|---|---|
| 1 | x | x | x | x | 1/2 |
| 2 | O | O | x | x | 1/4 |
| 3 | x | O | x | x | 1/8 |
| 4 | O | x | x | x | 1/16 |
| 5 | x | x | O | x | 1/32 |
| 6 | O | O | O | x | 1/64 |
| 7 | x | O | O | x | 1/128 |
| 8 | O | x | O | x | 1/256 |
| 9 | x | O | O | O | 1/512 |
| 10 | O | x | x | O | 1/1024 |
| 11 | x | x | x | O | 1/2048 |
| 12 | O | O | O | O | 1/4096 |
| 13 | x | O | O | O | 1/8192 |
| 14 | O | | | | |

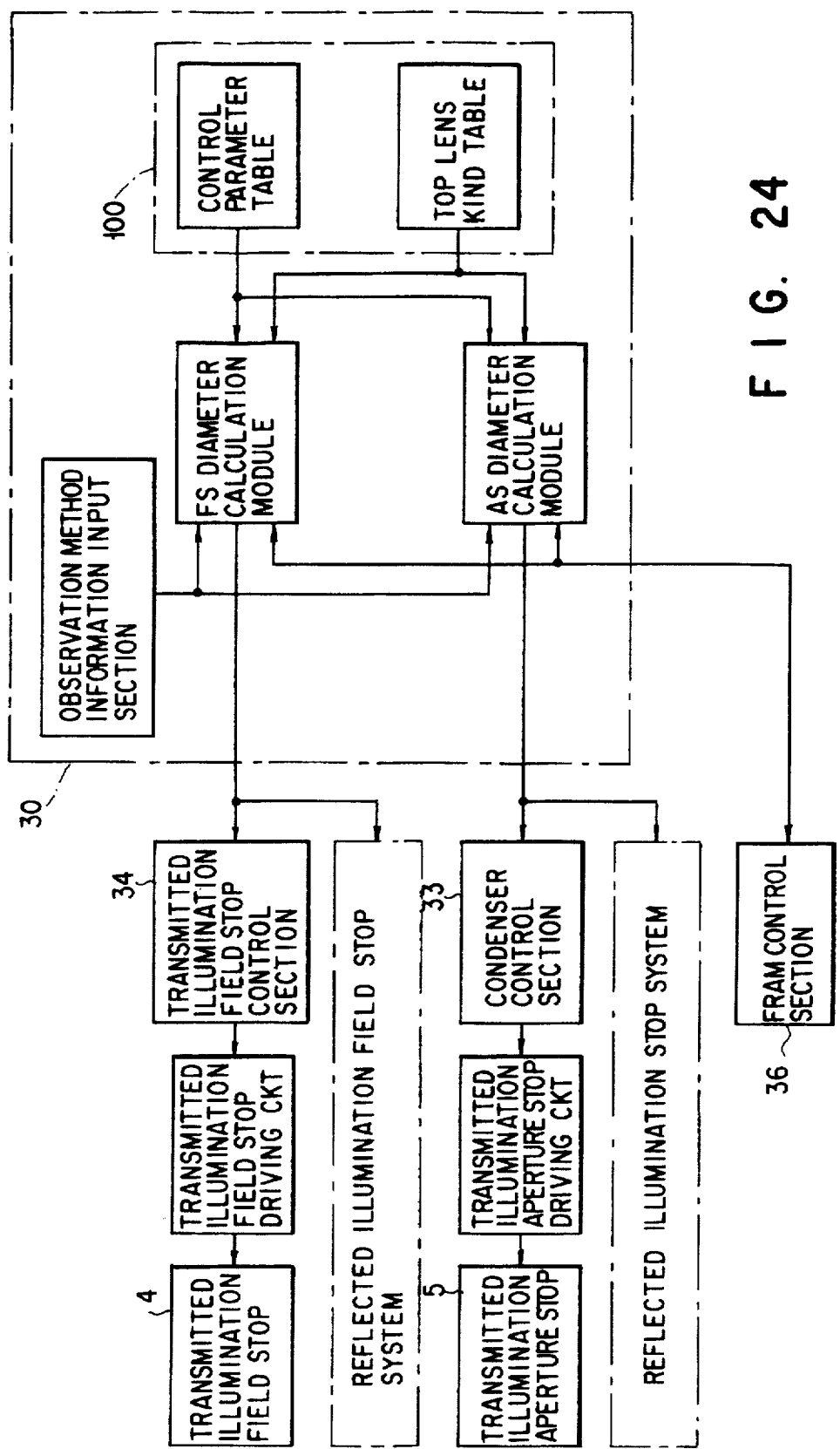
F I G. 24

TOP LENS DATA
| KINDS OF TOP LENSES | FOCAL DISTANCE (CDf) | FS PROJECTION MAGNIFICATION (FS mag) |
|---|---|---|
| TOP LENS OF LOW POWER | 41.7 | 0.85 |
| TOP LENS OF HIGH POWER | 11.4 | 0.14 |
F I G. 25
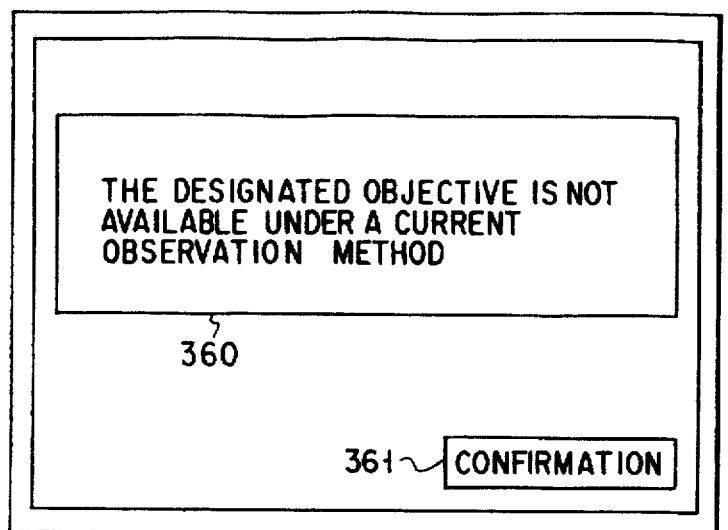
F I G. 26
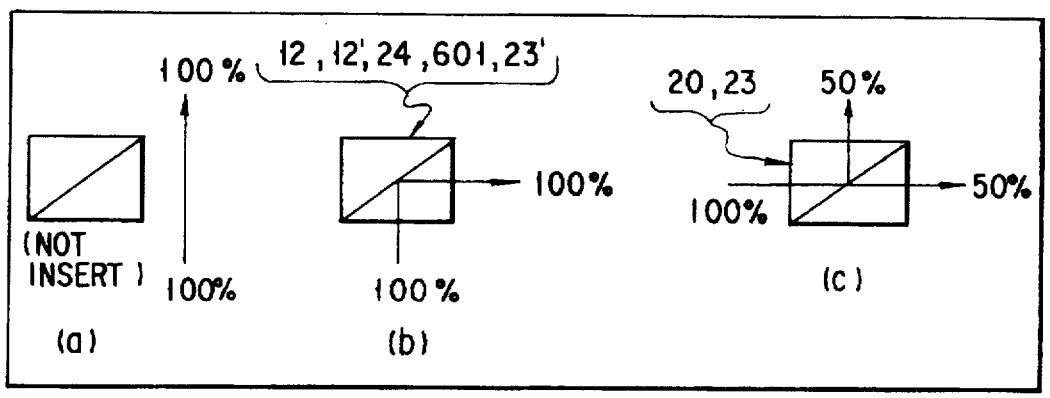
F I G. 28

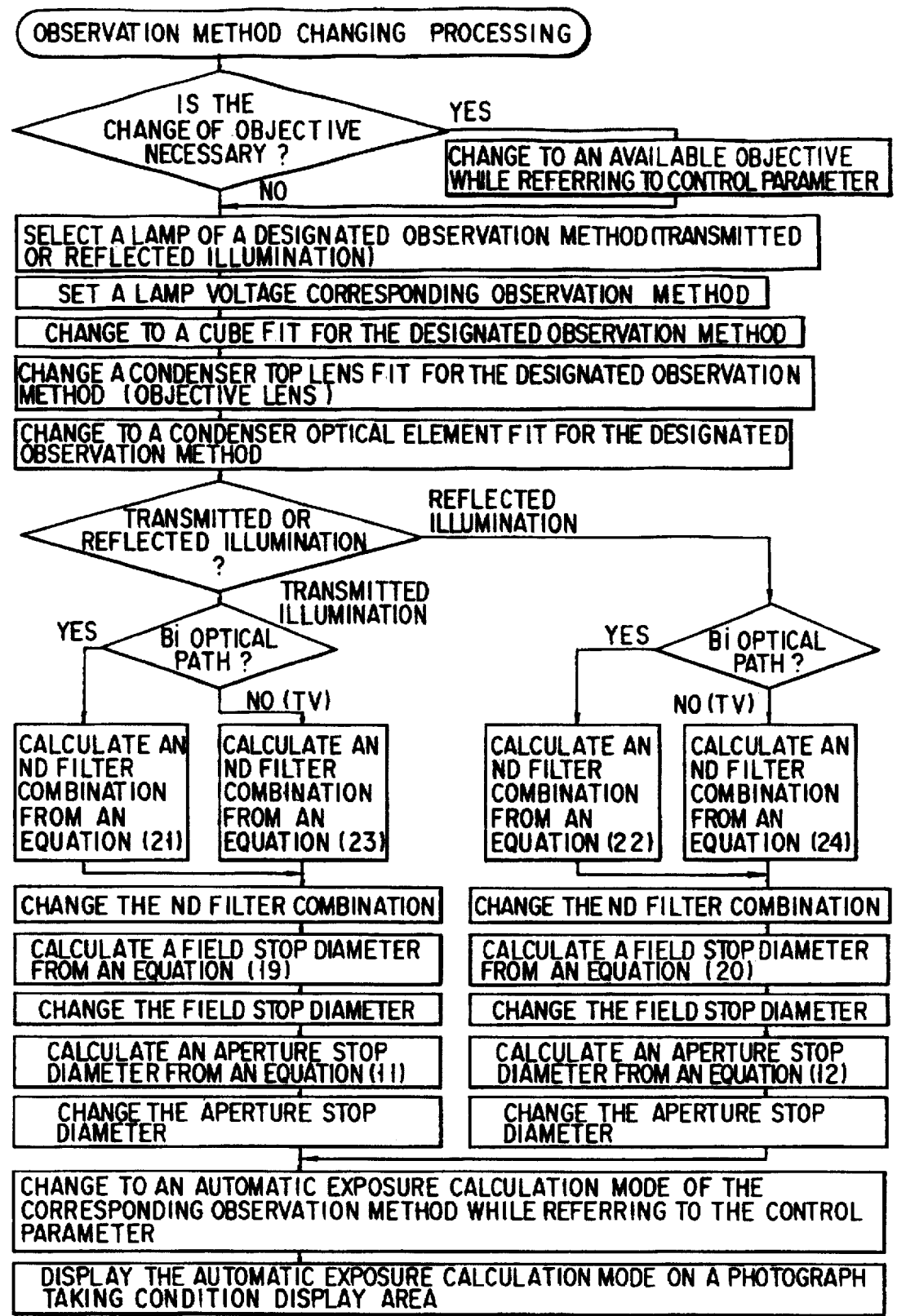
F I G. 32

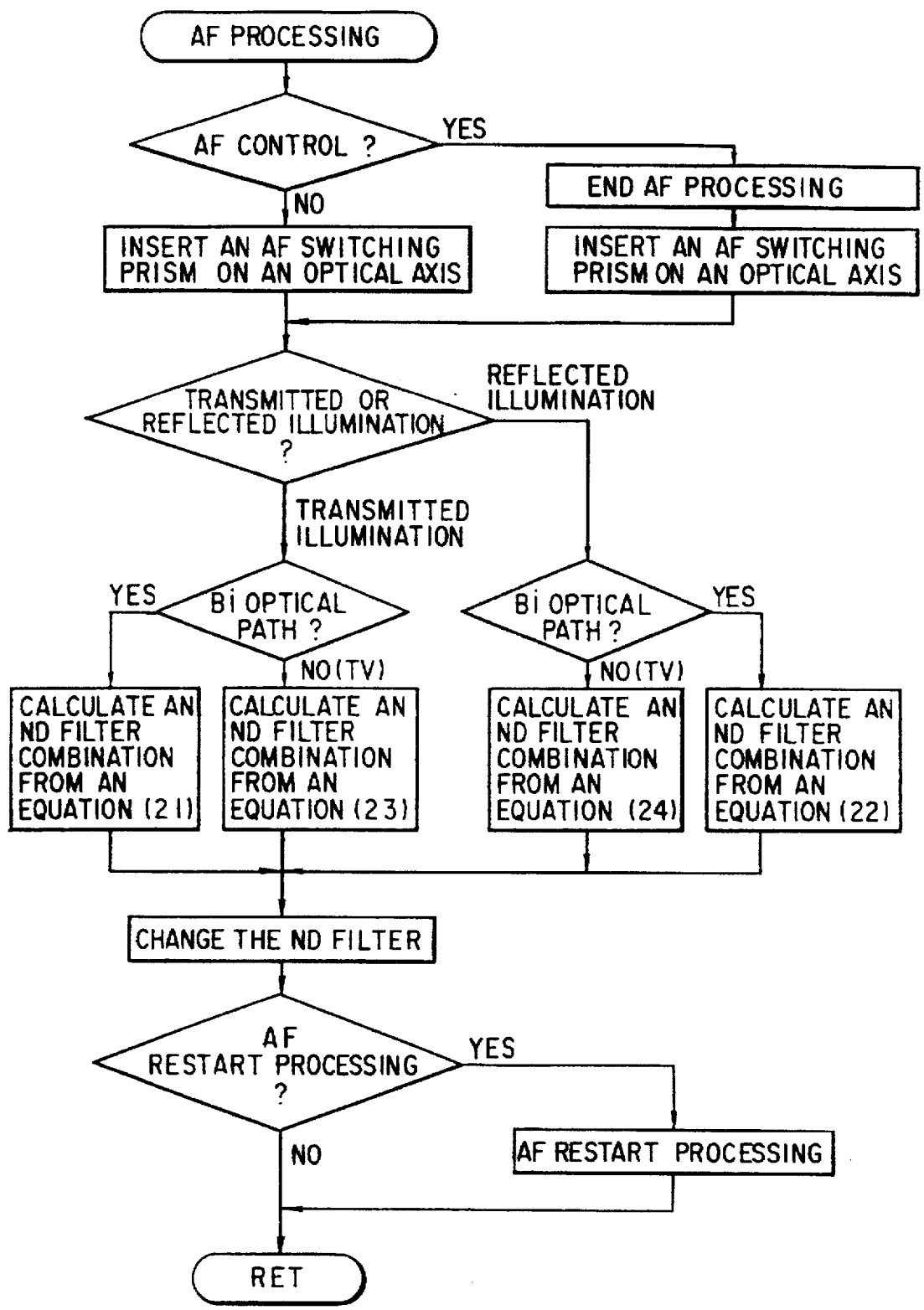
F I G. 35

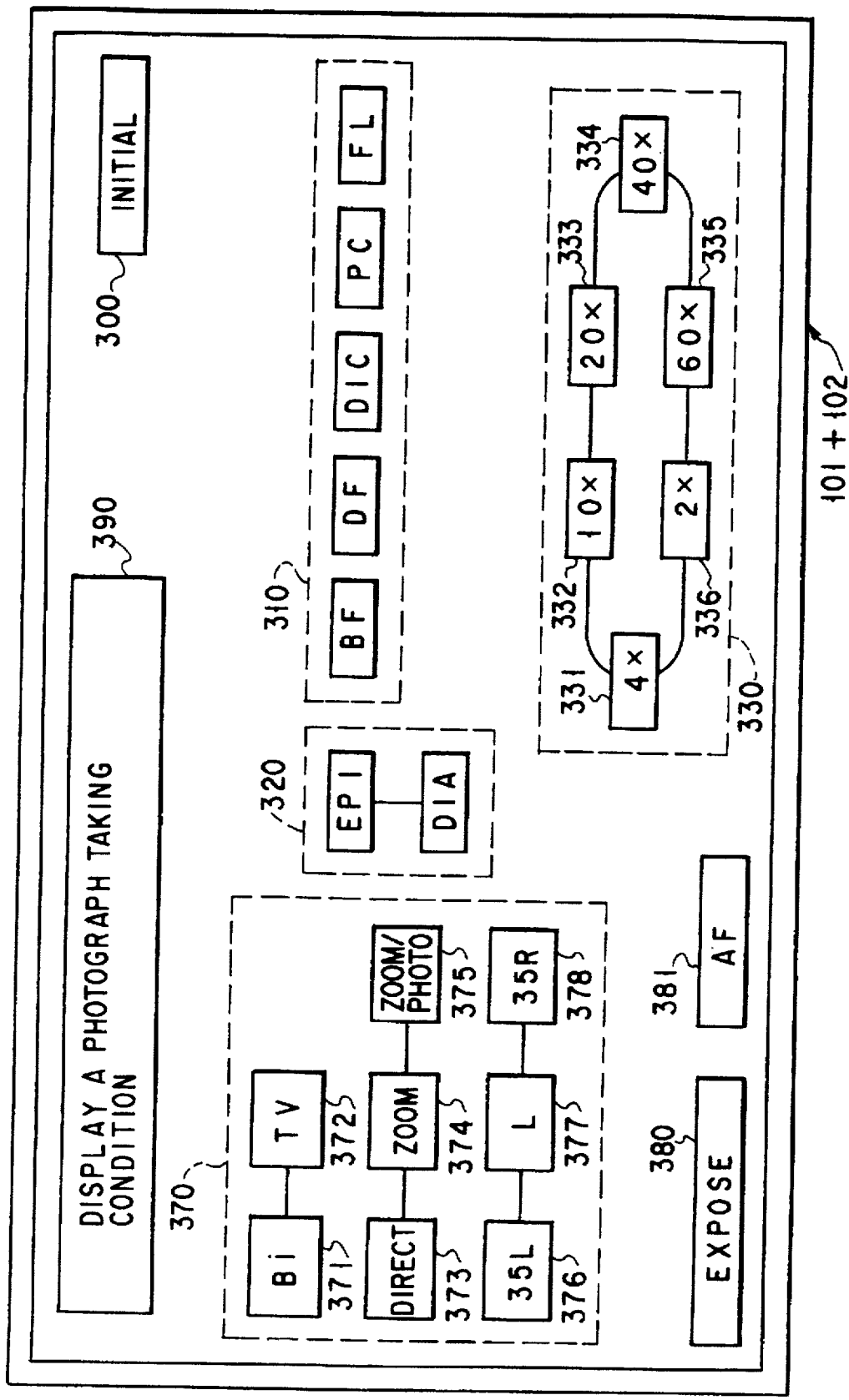
F I G. 37

| SET OPTICAL PATH | PRISM STATE (NO. IN FIGURES) | | | LIGHT AMOUNT RATIO Bi | LIGHT AMOUNT CORRECTION VALUE ($\log_a Bi$) |
|---|---|---|---|---|---|
| | 12, 12' | 20 | 23 | | |
| DIRECT | OUT | — | — | 100 % | 0 |
| ZOOM OPTICAL PATH | IN | OUT | OUT | 70 % | −2 |
| ZOOM / AF | IN | IN | OUT | 35 % | −6 |
| ZOOM / LIGHT MEASUREMENT | IN | OUT | IN | 14 % | −11 |
| ZOOM / LIGHT MEASUREMENT / AF | IN | IN | IN | 7 % | −15 |

F I G. 38

CALCULATION MODE FOR EACH OBSERVATION MODE

| OBSERVATION METHOD | TRANSMITTED ILLUMINATION OBSERVATION METHOD | | | | REFLECTED ILLUMINATION OBSERVATION METHOD | | |
|---|---|---|---|---|---|---|---|
| | BRIGHT FIELD MICROSCOPY | DARK FIELD MICROSCOPY | DIFFERENTIAL INTERFERENCE MICROSCOPY | PHASE CONTRAST MICROSCOPY | BRIGHT FIELD MICROSCOPY | DARK FIELD MICROSCOPY | FLUORESCENCE MICROSCOPY |
| EXPOSE CALCULATION MODE | AUTO | FL-AUTO | AUTO | AUTO | AUTO | FL-AUTO | SEL-AUTO |

| Control Parameter | | | | Observation Method | Transmitted Illumination Method | | | | Reflected Illumination Observation Method | | | Fluorescence Microscopy | Kind of Top Lens |
|---|---|---|---|---|---|---|---|---|---|---|---|---|---|
| | | | | | Bright Field Microscopy | Dark Field Microscopy | Differential Interference Microscopy | Phase Contrast Microscopy | Bright Field Microscopy | Dark Field Microscopy | Differential Interference Microscopy | | |
| Revolver Position No. | Objective Magnification OBmag | Numerical Aperture OBna | Brightness Coefficient log a OB | Item | | | | | | | | | |
| 1 | 4 | 0.16 | 0 | Field Stop (Kfs) / Aperture Stop (Kas) | 1.0 / 0.64 | x / x | x / x | x / x | x / x | x / x | x / x | x / x | Low Power |
| 2 | 10 | 0.40 | −1 | Field Stop (Kfs) / Aperture Stop (Kas) | 1.0 / 0.64 | 1.0 / ∞ | 1.0 / 0.64 | 1.0 / ∞ | 1.0 / 0.64 | 1.0 / ∞ | 1.0 / 0.64 | 1.0 / 1.0 | High Power |
| 3 | 20 | 0.70 | −5 | Field Stop (Kfs) / Aperture Stop (Kas) | 1.0 / 0.64 | 1.0 / ∞ | 1.0 / 0.64 | 1.0 / ∞ | 1.0 / 0.64 | 1.0 / ∞ | 1.0 / 0.64 | 1.0 / 1.0 | High Power |
| 4 | 40 | 0.85 | −13 | Field Stop (Kfs) / Aperture Stop (Kas) | 1.0 / 0.64 | 1.0 / ∞ | 1.0 / 0.64 | 1.0 / ∞ | 1.0 / 0.64 | 1.0 / ∞ | 1.0 / 0.64 | 1.0 / 1.0 | High Power |
| 5 | 60 | 0.85 | −11 | Field Stop (Kfs) / Aperture Stop (Kas) | 1.0 / 0.64 | 1.0 / ∞ | 1.0 / 0.64 | 1.0 / ∞ | 1.0 / 0.64 | 1.0 / ∞ | 1.0 / 0.64 | 1.0 / 1.0 | High Power |
| 6 | 2 | 0.08 | 0 | Field Stop (Kfs) / Aperture Stop (Kas) | 1.0 / 0.64 | x / x | x / x | x / x | x / x | x / x | x / x | x / x | Low Power |
| Brightness Correction Value for Each Observation Method (log Kk) | | | | | 0 | −32 | −12 | −32 | 0 | −32 | 0 | −40 | |
| Manual Correction Coefficient (log Km) | | | | | 0 | 0 | 0 | 0 | 0 | 0 | 0 | 0 | |
| TV Optical Path Manual Correction Coefficient (log Kt) | | | | | −4 | −4 | −4 | −4 | −4 | −4 | −4 | −4 | |
| Illumination Light Source Lamp Voltage (Lvol) | | | | | 9.0 | 9.0 | 9.0 | 9.0 | 9.0 | 9.0 | 9.0 | 9.0 | |

(x: Unavailable)

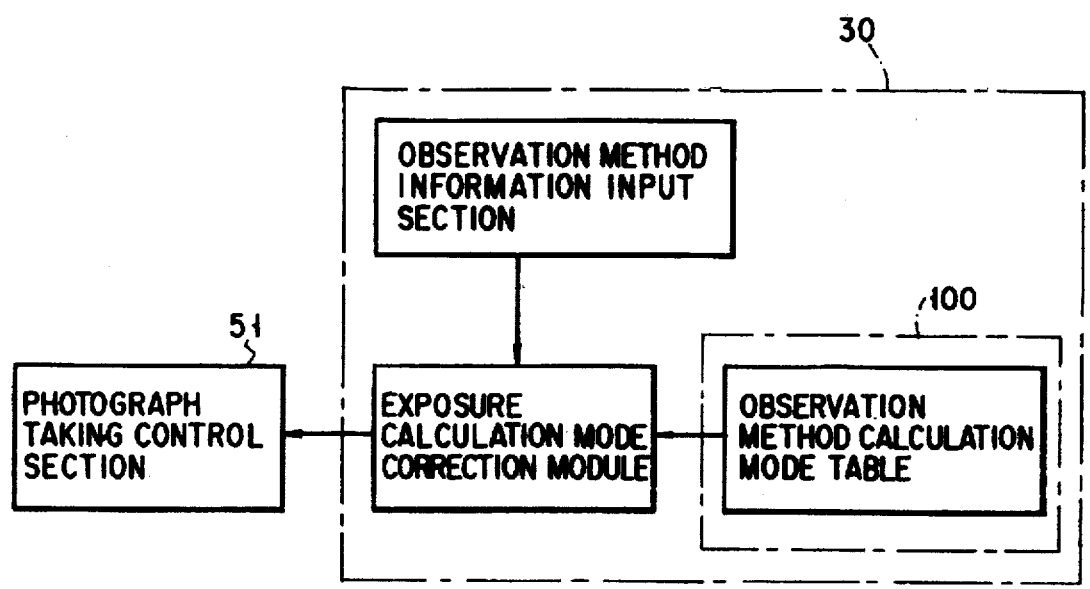
F I G. 42

MICROSCOPE SYSTEM FOR CONTROLLING OPTICAL ELEMENTS IN INTERLOCK WITH A VARIATION IN OBSERVATION CONDITIONS

BACKGROUND OF THE INVENTION

1. Field of the Invention

The present invention relates to a microscope system capable of switching its observation methods and, in particular, to a microscope system capable of controlling optical elements in interlock with a variation in observation conditions.

2. Description of the Related Art

In connection with research in the biological field, for example, and inspection processes in the industrial field, etc., microscope system have been utilized so as to observe a microsample under a magnified condition or to record an enlarged observation image as a photo image or as a video image.

There are some microscope systems capable of switching the observation method from one mode to another mode by changing the magnifications and types of objectives or a form of illumination on the sample. Various observation methods are known under the, including bright field microscopy, dark field microscopy, differential interference microscopy, polarizing microscopy, etc. The observer selects, out of these, an optimal observation method to be set to the microscope system in accordance with the kinds of samples, conditions of their properties, etc.

In the microscope system, on the other hand, the observation method is switched in accordance with an exchange of objectives and a change of condensers and, in order to maximize the performance of the microscope it is necessary that, each time a different observation method is used, the brightness of illumination light and the state of a diaphragn be optimally re-set in accordance with the newly switched condition.

However, in order to newly arrange the optical system in an optimal state under the observation method applied to the microscope system, it has here to before been required that the observer has a high skill in the operation of microscopes.

SUMMARY OF THE INVENTION

A first object of the present invention is to provide a microscope apparatus which can automatically control an optical condition, such as an optimal state stop and brightness, in accordance with a selected observation method, achieve an improved operability while reducing any cumbersome microscope operation, and obtain the best observation image at all times even if the observation method is changed.

A second object of the present invention is to provide a microscope apparatus which can record an exposure calculation mode for each observation method, change a photograph taking mode in interlock with the change of the observation method and prevent the taking of a wrong photograph.

A microscope apparatus of the present invention has:
 a light source for generating illumination light;
 an illumination optical system for illuminating an object to be observed with the illumination light;
 an observation optical system for leading an observation image of the illuminated object to an observation site;
 an optical system control section for independently controlling optical elements arranged in the illumination optical system and optical elements arranged in the observation optical system;
 a recognizing section for recognizing, out of a plurality of predetermined observation methods, an observation method designated by the observer;
 a memory for registering, as table data, setting conditions of the optical elements corresponding to the respective observation methods; and
 a correction module for taking, out of the memory, the setting conditions of the optical elements corresponding to the observation method recognized by the recognizing section and for preparing, based on the taken setting conditions, an instruction supplied to the optical system control section so that the optical elements are corrected.

According to the microscope apparatus thus structured, the setting condition of the optical element, such as the brightness condition of the illumination light corresponding to the observation method changed at an observation method change time is read from the table data so that the optical element is controlled in accordance with the setting condition.

The microscope apparatus of the present invention has:
 the observation optical system including an optical element for taking the light of an observation image corresponding to the object from the observation optical system and a photograph taking optical system for allowing the light of the observation image which is taken from the optical element to be incident thereon;
 the photograph taking optical system including a photograph taking section for taking a photograph corresponding to the observation image and a light measuring section for measuring the light amount of the observation image incident on the photograph taking optical system;
 the control section including an exposure calculation section for subjecting a light amount corresponding to the observation image which is measured by the light measuring section to processing based on one of a plurality of exposure calculation mode and finding an exposure time and a circuit for informing the exposure time which is found by the exposure calculation section to the photograph taking section;
 the memory registering the observation method kind calculation mode table wherein, exposure calculation mode correspond to the respective observation methods; and
 the correction module for, when the observation method is designated by the observer, taking the exposure calculation mode corresponding to the designated observation method from the observation method kind calculation mode table stored in the memory.

According to the microscope apparatus thus structured, the exposure calculation mode corresponding to the designated observation method is read out from the memory at the time of changing the observation method and informed to the photograph taking section.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is a view generally showing a microscope apparatus according to a firs embodiment of the present invention;

FIG. 7 is a flow chart showing initialization processing of the first embodiment;

FIG. 13 is a view showing a table on objective lens parameters;

FIG. 14 is a view showing a table on observation method kind parameters;

FIG. 15 is a view showing a table on control parameters;

FIG. 16 is a function block diagram relating to objective fitness checking;

FIG. 17 is a function block diagram relating to the correction of light sources, cubes and condensers;

FIG. 18 is a view showing a table on cube position data;

FIG. 19 is a view showing a table on optical element position data;

FIG. 21 is a view showing a filter position and kinds of filters;

FIG. 22 is a view showing a relation between combination filters and a corresponding light amount ratio;

FIG. 23 is a view showing a table on the ND filter combinations;

FIG. 24 is a function block diagram relating to the correction of a stop;

FIG. 25 is a view showing a table on per-top lens data;

FIG. 26 is a view showing the contents of a warning display;

FIG. 28 is a view showing a reflection ratio and light amount splitting ratio of each prism;

FIG. 32 is a flow chart of observation method switching processing of the second embodiment;

FIG. 35 is a flow chart showing AF processing of the second embodiment;

FIG. 37 is a top view showing an operation screen;

FIG. 38 is a view showing a table on per-optical path light amount ratios;

FIG. 39 is a view showing a table on control parameters of the second embodiment;

FIG. 41 is a view showing a table on a calculation mode of observation method; and FIG. 42 is a function block diagram relating to the exposure calculation operation of the second embodiment.

DETAILED DESCRIPTION OF THE PREFERRED EMBODIMENTS

Figure 2:
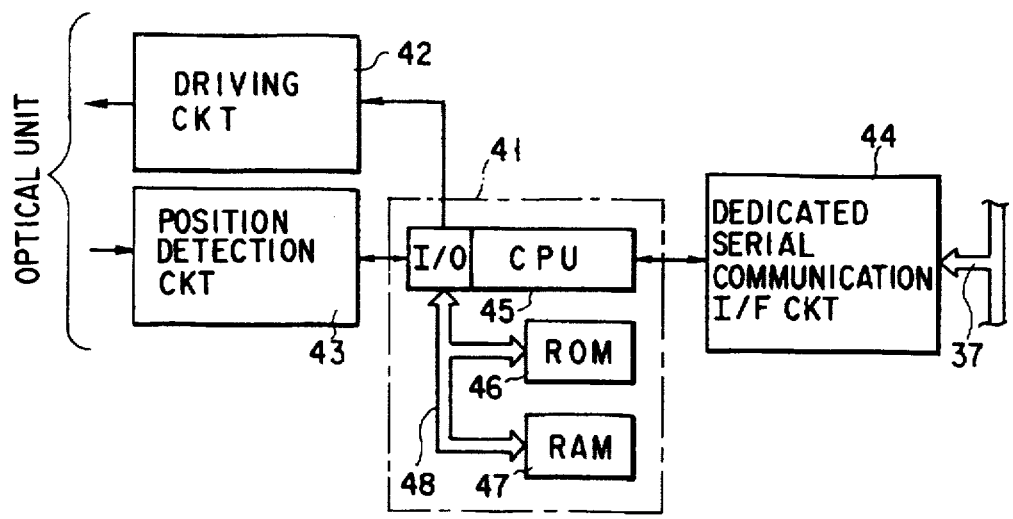
FIG. 2 is a schematic view showing each kind of control section provided in the microscope apparatus of the first embodiment.

The embodiments of the present invention will be explained below with reference to the accompanying drawings.

(First Embodiment)

FIG. 1 shows a general arrangement of a microscope apparatus of the present embodiment. In the optical system in the microscope apparatus of the present embodiment, light coming from a transmitted illumination light source 1 comprised of, for example, a halogen lamp is condensed by a collector lens 2 into a transmitted illumination filter unit 3.

The filter unit 3 comprises a plurality of ND filters for adjusting the brightness of the light without varying the color temperature of the transmitted illumination light source and a plurality of correction filters for color correction and any filters can be selectively inserted into an optical path of an illumination optical system.

The transmitted illumination optical system is of such a type that an observation sample S on a stage 8 is illuminated with illumination light passed through the filter unit 3, that is, the illumination light coming from below the stage 8 past a transmitted illumination field stop 4, transmitted illumination aperture stop 5, condenser optical element unit 6 and condenser top lens unit 7.

The condenser optical element unit 6 is comprised of a plurality of optical elements 6a to 6c selectively inserted into the optical path. The optical element 6a is used for a dark field observation, the optical element 6b for differential interference observation and the optical element 6c for a phase contrast observation.

The condenser top lens unit 7 is comprised of a plurality of top lenses 7a, 7b selectively inserted into the optical path. The top lens 7a is used upon observation at low power (magnification of objective is less 10X) and the top lens 7b upon observation at high power (magnification of objective is more than 10X).

The sample stage 8 can be two-dimensionally moved in a plane perpendicular to an optical axis (scanning of an observation sample) and can be moved toward the optical axis for focusing.

A plurality of objectives 9a to 9c are held by a revolver 9 over the sample stage. An objective to be inserted onto the observation optical path can be changed through the rotation of the revolver 9. The revolver 9 is rotatably mounted on the forward end of, for example, a microscope's arm. The cube unit 11 is arranged on the observation path at the forward end portion of the arm.

The cube unit 11 is comprised of a plurality of cubes 11a to 11b selectively inserted under various kinds of observation. The cube 11a is a full reflection prism comprised of an optical element for a bright field, the cube 11b is an observation illumination light splitting prism comprised of an optical element for a dark field and 11c is a wavelength selection element comprised of an optical element for fluorescence.

The light transmitted through the cube unit 11 is conducted via an observation prism 13 to an eyepiece 14.

On the other hand, a reflected illumination optical system is of such a type that the light coming from a reflected illumination light source 15 comprised of, for example, a mercury lamp is passed through a reflected illumination filter unit 16, reflected illumination shutter 17, reflected illumination field stop 18 and reflected illumination aperture stop 19 and is incident to the cube inserted into the optical path of the cube unit 11 so that reflected illumination is obtained through light reflection back from the observation sample S side.

The reflected illumination filter unit 16 comprises a plurality of ND filters for adjusting the brightness of light without varying the color temperature of the reflected illumination light source 15 and a plurality of correction filters for color correction. The reflected illumination shutter 17 can be inserted into, and withdrawn from, the optical path and is adapted to shut off light from the reflected illumination light source.

An electric control system of the present microscope apparatus is so constructed as will be set out below.

A reflected illumination control section 31, reflected illumination filter control section 32, condenser control section 33, transmitted illumination field stop control section 34, transmitted illumination filter control section 35 and frame control section 36 are connected via a dedicated serial bus 37 to a main controller section 30 for managing the operation of the system as a whole.

The reflected illumination stop control section 31 is adapted to drive and control the reflected illumination field stop 18 and reflected illumination aperture stop 19 and the reflected illumination filter control section 32 is adapted to drive and control the reflected illumination filter unit 16.

The condenser control section 33 is adapted to drive and control the condenser optical element unit 6, condenser top lens unit 7 and transmitted illumination aperture stop 5.

Further, the transmitted illumination field stop control section 34 is adapted to drive and control the transmitted illumination field stop 4 and the transmitted illumination filter control section 35 is adapted to drive and control the transmitted illumination filter unit 3.

The frame control section 36 is adapted to drive and control the transmitted illumination light source 1, reflected illumination light source 15, revolver 9, cube unit 11 and reflected illumination shutter 17.

The respective control sections 31 to 36 have a circuit arrangement shown in FIG. 2.

The circuit arrangement contains a CPU circuit 41, a driving circuit 42 for driving the optical unit to be controlled by an instruction from the CPU circuit 41, a position detection circuit 43 for detecting the position of a driving section to be controlled and informing it to the CPU circuit 41, a dedicated serial communication I/F circuit 44 connecting the CPU circuit 41 to the dedicated serial bus 37, and peripheral circuits, not shown, in its control area.

The CPU circuit 41 includes a CPU 45 and a ROM 46 and RAM 47 connected to the CPU 45 via a CPU bus 48, the ROM 46 storing a program for describing respective control contents and the RAM 47 storing data for control calculation. Control instructions are sent from the main controller section 30 via the dedicated serial bus 37 to the respective control sections 31 to 36. The CPU 45 is operated in accordance with a program of the ROM 46 to control the optical unit, etc., under its own control section.

Figure 3:
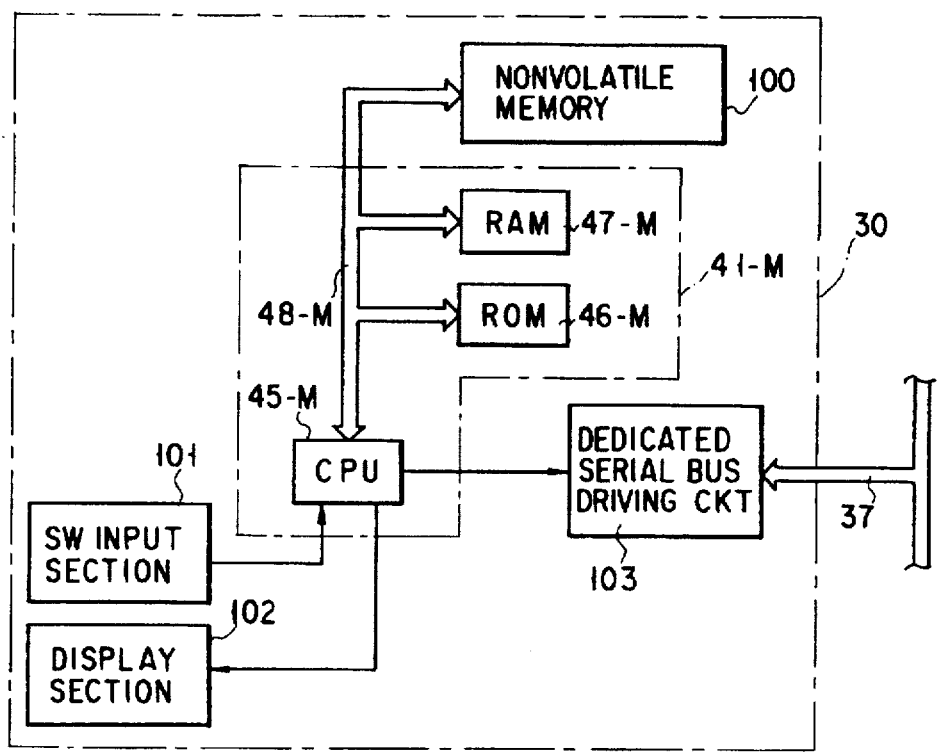
FIG. 3 is a schematic view showing a main controller section provided in the microscope apparatus of the first embodiment of the present invention.

FIG. 3 shows an arrangement of the main controller section.

The main controller section 30 comprises, in addition to a CPU circuit 41-M so arranged as set out in connection with the respective control sections 31 to 36, a nonvolatile memory 100 storing various set states relative to the microscope and maintaining memory contents in a stored state even after a power supply is shut off, a SW input section 101 having various kinds of operation SWs, a display section 102 for displaying various kinds of information, and a dedicated serial bus drive circuit 103 for controlling the dedicated serial bus 37.

Figure 4:
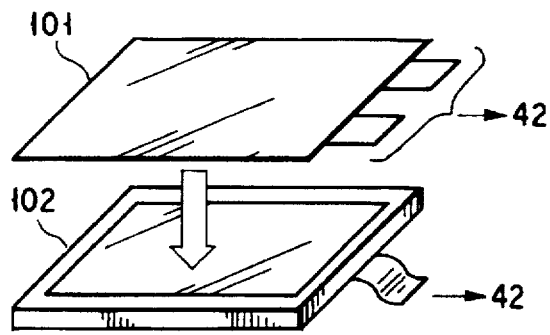
FIG. 4 is an exploded, perspective view showing a SW input section and display section in the first embodiment.
Figure 5:
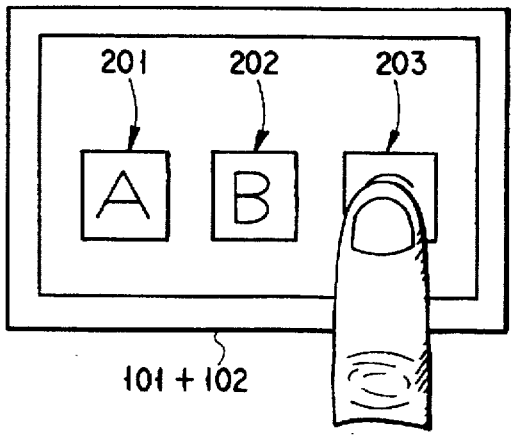
FIG. 5 is a top view showing the SW input section and display section in the first embodiment.

FIG. 4 shows the arrangement of the SW input section 101 and display section 102. The display section 102 is comprised of a display unit, such as a plasma display or LCD and displays display contents sent from the CPU 45-M. The SW input section 101 is comprised of, for example, a transparent sheet switch and bonded to the display section 102. The SW input section 101 is so formed that its touching (depressing) position can be recognized thereon. For example, if the SW display items 201 to 203 as shown in FIG. 5 are displayed on the display section 102 and the display item 203 is depressed by the user's finger on the display section, then the CPU 45-M recognizes which switch is finger-touched on the basis of the depressed position data on the SW input section 101 and display item data on the display section 102 and can effect a control operation corresponding to the depressed SW.

Figure 6:
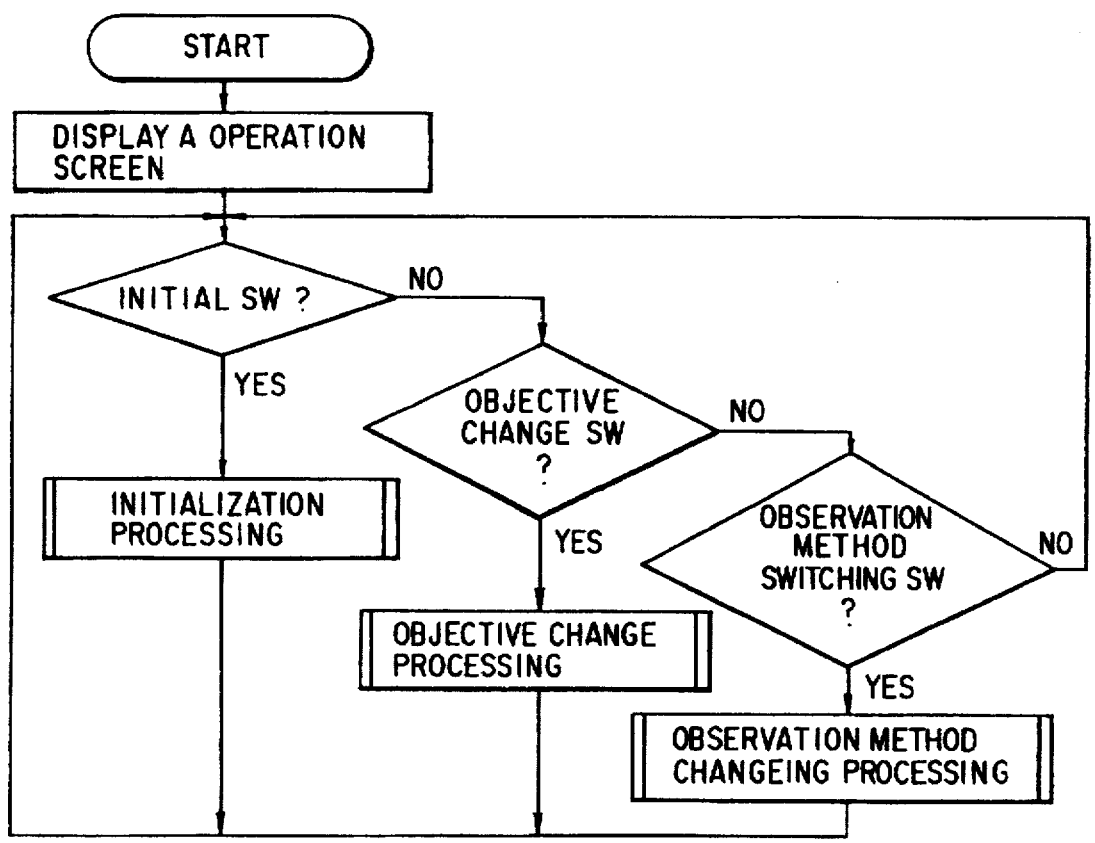
FIG. 6 is a flow chart showing a whole operation of the first embodiment.

FIG. 6 shows a flow of operations relating to the embodiment as a whole. That is, with a power supply turned ON, the operation display screen allows a response to any request for "initialization proceeding", "objective switching processing" and "observation method switching processing". FIG. 7 shows a flow chart on the "initialization processing", FIG. 8 on the "objective lens switching processing" and FIG. 9 on the observation method switching processing".

(Initialization Processing)

The setting of various kinds of parameters are carried out which are required, as a preceding stage of the microscope operation, for the switching of the observation methods and objectives. For example, the CPU 45-M recognizes which kind of objective is mounted in any specific objective mount hole in the revolver 9 and enables it to be stored in the nonvolatile memory 100.

Stated in more detail, with the power supply SW, not shown, depressed, the CPU 45-M in the main controller section 30 reads an operation screen display data from the ROM 46-M and displays it on the display section 102.

Figure 10:
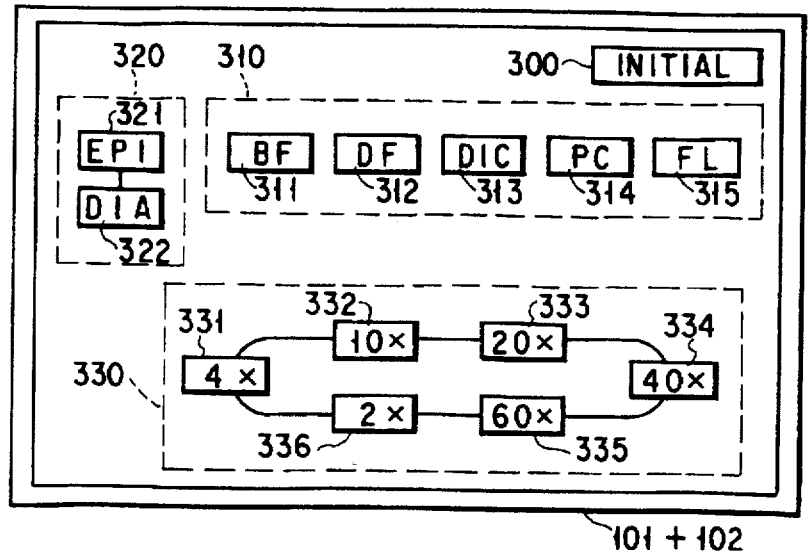
FIG. 10 is a plan view showing an operation screen.

FIG. 10 shows a practical form of the operation screen. The operation screen is comprised of an INITIAL switch 300 for calling the initialization screen, a switch display area 310 for the switching of the observation methods, a switch display area 320 for the switching of the illumination systems, and a switch display area 330 for objective designation. The area 310 has a bright field microscopy designating switch 311, a dark field microscopy designating switch 312, a differential interference microscopy designation switch 313, a phase contrast microscopy designation switch 314, and a fluorescence microscopy designation switch 315. The area 320 has a reflected illumination selection switch 321 and a transmitted illumination selection switch 322.

When initialization is performed, the "INITIAL" switch 300 is depressed on the operation screen. If this is done, processing is carried out in the following way.

At the main control section 30, the CPU 45-M reads out the initialization screen's display data from the ROM 46-M and enables the display section 102 to display the initialization screen.

Figure 11:
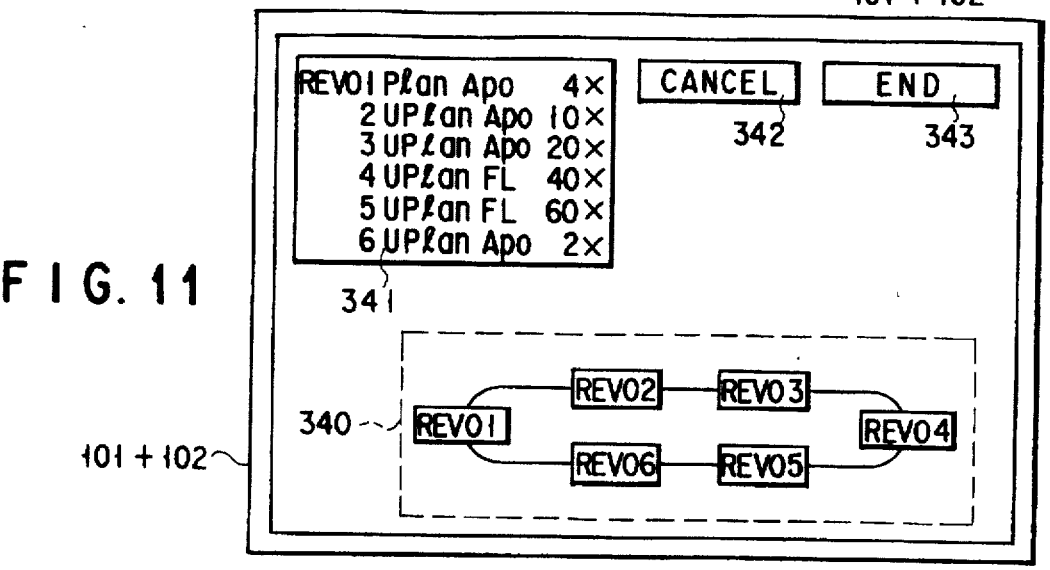
FIG. 11 is a plan view showing an initial screen.

FIG. 11 shows a practical form of the initialization screen. A SW display area 340 for designating the respective positions of objective mount holes in the revolver 9 is displayed on the initialization screen. The SW display area 340 is comprised of switches REV01 to REV06 and can designate six objective mount holes. The number of switches in the SW display area 340 corresponds to that of objective mount holes in the revolver 9 presently mounted on the microscope apparatus. Further, the screen contains a table showing any specific objectives and corresponding objective mount holes in the revolver 9, a CANCEL switch 342 for canceling the initialization operation, and an END switch 43 for ending the initialization operation.

If the switch REV01 (the mount position No. 1) is depressed on the initialization screen at the SW display area 340 of the revolver designation switch, an operation is shifted to allow the objective to be set in the objective mount hole in the revolver 9. That is, with the switch REV01 depressed, the CPU 45-M reads the objective setting screen display data from the ROM 46-M and enables it to be displayed at the objective setting screen on the display section 102.

Figure 12:
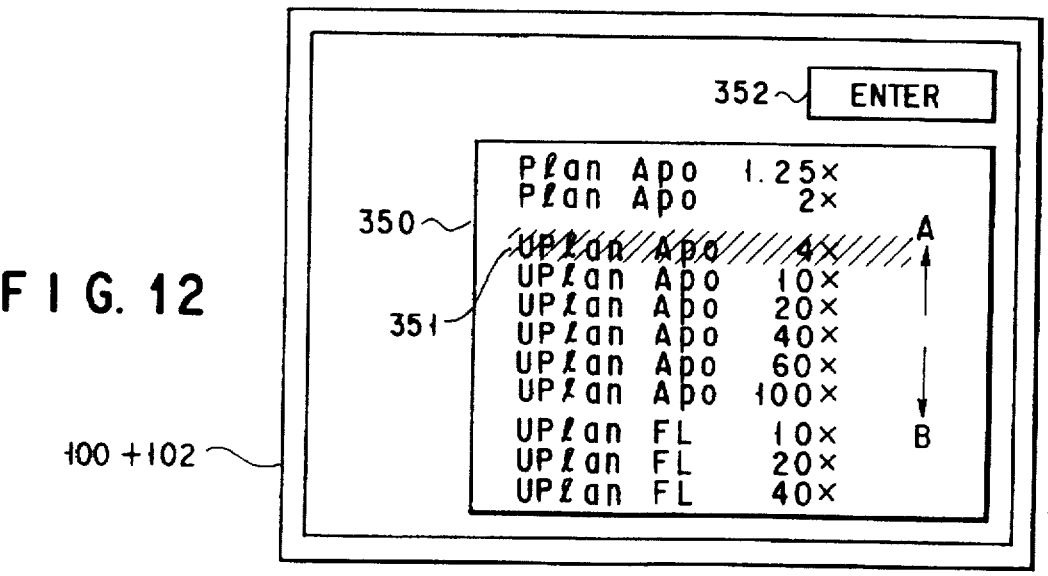
FIG. 12 is a view showing a table on settable objectives.

FIG. 12 shows a practical form of the objective setting screen. The objective setting screen contains a list 350 for settable objectives.

On the other hand, the CPU 45-M instructs a shift to a screen as shown in FIG. 12 and drives the dedicated serial bus drive circuit 103 and supplies a rotation instruction for the revolver 9 to the frame control section 36 via the dedicated serial bus 37. Upon receipt of the rotation instruction, the frame control section 36 drives the driving circuit 42 to align the objective mount hole No. 1 of the revolver 9 with the optical axis position, so that the objective designated by the switch REV01 is inserted on the observation path.

After the rotation of the revolver 9 is ended, the operator confirms the objective inserted on that optical path and designates the corresponding objective by searching for that objective by referring to the list 350 on the display section 102. Here, an operation signal can be input from a jog dial, not shown, connected to the CPU circuit 41-M in the main controller section 30 to the CPU 45-M. A designation display section 351 is moved at a given speed over an operation interval in a direction (direction A or B) corresponding to the rotation direction of the jog dial. The stop position of that determined designation display section 351 is read onto the apparatus and the objective designated on that position is recognized as the designated objective.

After the designation of the objective is ended, an ENTER switch 52 is depressed on the same screen and the CPU 45-M prepares a table on the parameters of the objective designated on the designation display section 351 on the objective list 350. The ROM 46-M of the main controller section 30 contains, together with an execution program, stored parameter information on the respective objective displayed on the objective list 350.

FIG. 13 shows the parameter table of the objectives.

The objective parameter table stores, therein, data on all the objectives usable in that system, that is, registers, thereon, for respective lenses, their kinds (OB types), their magnifications (OBmag), their numeral apertures (OBna), their focal distances (OBf), their brightness coefficient (logaOB) and their usable observation methods.

The ROM 46-M registers, as initial data, the field stop, aperture stop and corrected value of brightness. FIG. 14 shows a form of Table storing, as the initial data, the corrected value of brightness and stop diameters for respective observation methods.

The CPU 45-M, referring to the Table as shown in FIG. 14, updates the location of the revolver position No. 1 of the parameter table for control as shown in FIG. 15 and stores it in the nonvolatile memory 100 in the main controller section 30. At the time of changing the objectives and of switching the observation methods, the control parameter table is used for actual control.

The initialization is ended by repeating the above-mentioned operation up to the switches REV01 to REV06 of the SW display area 340. Here, the data set in the nonvolatile memory 100 is retained there after the power supply is cut off and it is not necessary to again reset them so long as the objective mounted in the revolver 9 remains unchanged. After the setting of the control parameters on REV01 to REV06, the observer depress an END switch 343 on the screen as shown in FIG. 11 and the objective setting screen as shown in FIG. 11 is ended.

With the END switch 343 depressed, the CPU 45-M displays the operation screen (FIG. 10) on the display section 102, placing the microscope in an operable state.

An explanation will be given below of the function of the actual microscope operation.

Figure 9:
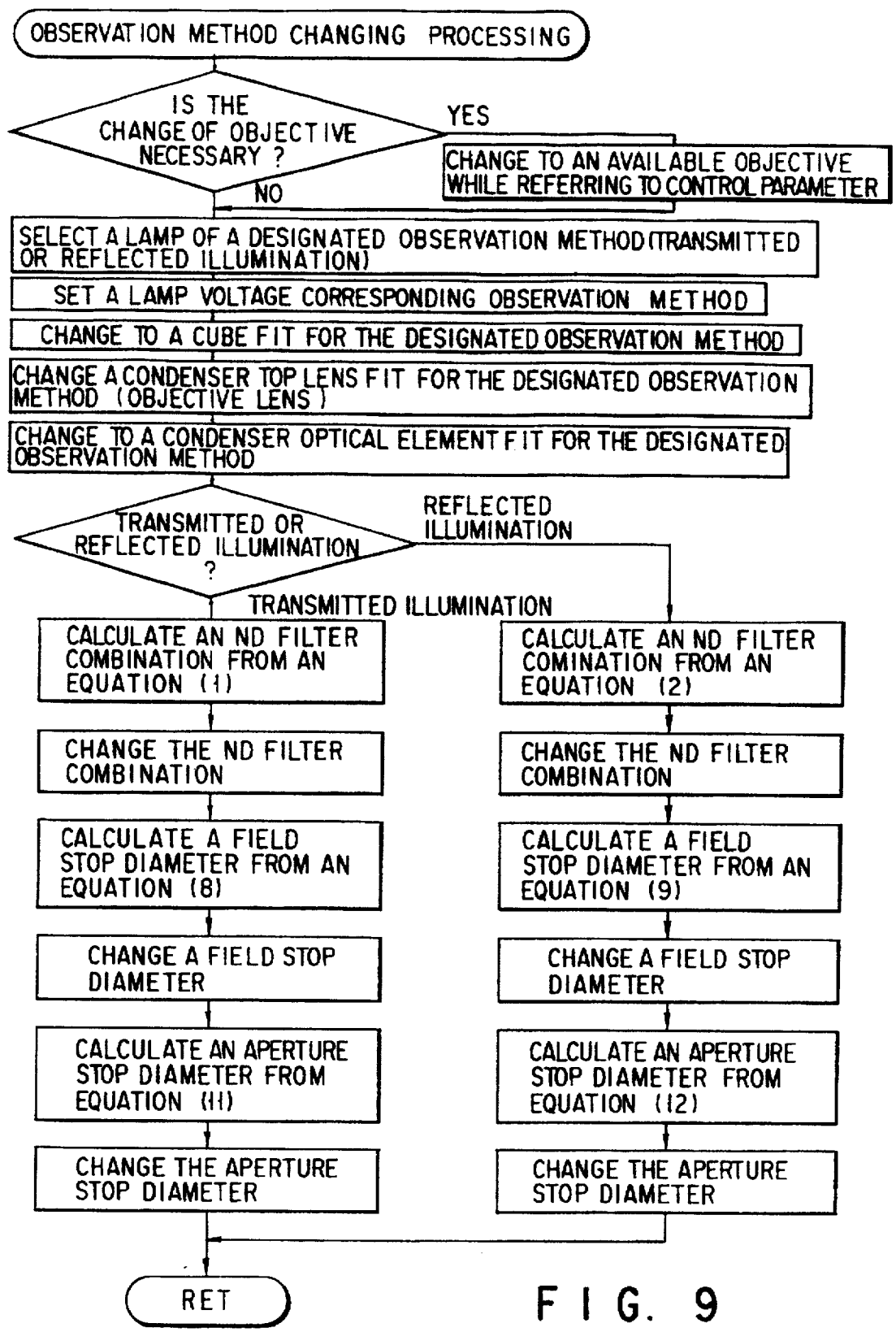
FIG. 9 is a flow chart showing observation method switching processing of the first embodiment.

When the operator touches (selects) the bright field designation switch 311 (BF) as one of the observation method designation switches on the operation screen (FIG. 10), the CPU 45-M determines from the display contents of the SW input section 101 and display section 102 that the transmitted bright field illumination observation is designated and a shift to the transmitted bright field illumination observation is started. That is, the observation switching processing is executed based on the flow chart as shown in FIG. 9 in a sequence (1) to (5).

(1) Checking the Objective for Fitness

FIG. 16 is a function block diagram on the checking of the objective for its fitness.

The main controller section 30 checks the currently selected objective, that is, the objective inserted on the optical path of the observation optical system, to see whether or not it is fit for the observation by the designated observation method. If the selected objective is not fit for the designated observation method, the objective is changed. Referring to the control parameter table in FIG. 15 all the objectives are fit for the transmitted bright field illumination microscopy and it is not necessary to change the objective. Suppose that it is necessary to change the objective, then the following steps are carried out.

The CPU 45-M performs predetermined steps as shown in FIG. 9 and functions as a fitness determination module and objective correction module. Further, the observation method information input section is comprised of the operation screen and SW input section 101.

The fitness determining module takes the fitness information of the objective from the control parameter table as shown in FIG. 15. For example, the usable observation method of the objective on the revolver position No. 1 is for the transmitted bright field illumination observation only and the other methods are not usable. Here, if the transmitted illumination differential interference switch SW 312 is designated, it is determined as being not fit.

If it is necessary to change the objective, an instruction is issued to make a change from the fitness determination module to the objective correction module. The objective correction module selects, out of a plurality of objectives fit for the designated observation method, an objective of smaller power. In this example, the revolver positions No. 2 to No. 5 allow the transmitted illumination differential interference observation and selection is made of the objective of smaller power at the revolver position No. 2.

In the objective correction module, after the determination of the exchange objective the CPU 45-M drives the dedicated serial bus driving circuit 103 and an instruction to rotate the revolver 9 is supplied to the frame control section 36 via the dedicated serial bus 37. Upon receipt of the rotation instruction the frame control section 36 drives the driving circuit 42 to allow the designated mount hole to be aligned with the optical axis position.

(2) Changing of Illumination Paths

FIG. 17 shows a function block diagram on that portion relating to a change of the illumination path. The light source correction module, cube correction module, condenser top lens correction module and optical element correction module are function blocks realized by executing predetermined steps in the flow chart as shown in FIG. 9.

When the designation observation method is designated from the observation information input section, control is so made that, in order to effect an illumination observation fit for the designated observation method it secures a corresponding illumination path.

First, the light source is corrected by the light source correction module. That is, the supplying destination of the lamp voltage is switched depending upon either the transmitted illumination observation method or the reflected illumination observation method. In order to turn on the transmitted illumination light source 1 for the transmitted illumination observation method and the reflected illumination light source 15 for the reflected illumination observation method, the CPU 45-M informs an illumination light source control instruction to the frame control section 36 via the dedicated serial bus 37.

The supplying voltage of the illumination light source is controlled to a lamp voltage (Lvol) registered on the control parameter table in FIG. 15. An example as shown in FIG. 15 is equally 9.00 (V) for all the observation methods. The data above is determined as the initial value at the data initialization time so as to maintain the color temperature constant. It may be possible to set a different lamp voltage for each observation method.

By an instruction issued from the main controller section 30 the frame control section 36 controls the transmitted illumination light source 1 for the transmitted illumination observation method and the reflected illumination light source 15 for the reflected illumination observation method to apply a lamp voltage. As a result, the lamp voltage fit for the designated observation method has been supplied to the power supply corresponding to the designated observation method.

Then the correction of the cubes is performed by the cube correction module. The cube correction module takes the cube setting condition from the cube kind table initially stored in the nonvolatile memory 100.

FIG. 18 shows a practical form of the cube kind table. The cube kind table shows the cube positions in the cube unit 11 and corresponding cube kinds mounted at the respective position. It is to be noted that the cube kind table is initially set by a cube initialization SW, not shown, in the same method as that of the initialization operation of the objectives.

The cube correction module takes the cube data fit for the designated observation method from the cube kind table as shown in FIG. 18 and sends a control instruction to the frame control section 36 to allow the taken cube to be inserted on the observation optical path. That is, the reflected bright field illumination cube of the cube 11a is so inserted when the reflected bright field illumination observation is designated, the reflected dark field illumination cube of the cube 11b when the reflected dark field illumination observation is designated and the reflected fluorescence illumination cube of the tube 11c when the reflected fluorescence illumination observation is designated.

When the reflected illumination method is designated, the corresponding cube is required and the cube fit for that designated observation method is inserted onto the observation optical axis. While, on the other hand, the transmitted illumination method is used, no cube is required and a corresponding instruction is made to the frame control section 36 to allow a corresponding empty hole of the cube unit 11 to be aligned on the optical axis. In the case shown in FIG. 18, the empty hole corresponding to the cube position No. 4 is aligned with the observation optical axis.

Upon receipt from the cube correction module, the frame control section 36 drives the cube unit 11 by the driving circuit 42 to allow the designated cube to be inserted onto the optical axis position.

Finally, the control of the condenser 39 is carried out, that is, it is done by controlling the two units, that is, the condenser top lens unit 7 and optical element unit 6. The condenser top lens correction module, referring to the control parameter table, selects the magnification of the condenser top lens in accordance with the magnification of a currently inserted objective. For example, an instruction is so issued to the condenser control section to allow an objective of low power to be aligned on the optical axis if it is <10X and an objective of high power to be aligned on the optical axis if it is ≧10X. After the top lens to be inserted is determined, the condenser top lens correction module sends a corresponding control instruction to the condenser control section 33 to allow the condenser control section 33 to insert either one of the top lenses 7a and 7b on the optical axis through the driving circuit.

Then based on the set condition obtained from the optical element kind table, the optical element correction module sends an instruction to correct the optical elements of the condenser optical element unit 6 to the condenser control section 33.

FIG. 19 shows a practical form of the optical element kind table. This table indicates the optical element positions of the condenser optical element unit 6 and the kinds of the optical elements mounted to these respective positions. The table as shown in FIG. 19 is initially stored in the nonvolatile memory 100 and set, by the optical element initialization SW, not shown, in the same method as by the initialization operation of the objective.

The condenser optical element correction module takes the optical element and position data fit for the designated observation method from the optical element kind table so as to allow the taken optical element to be inserted onto the optical axis. For example, an optical element 6a of the optical element position No. 1 is inserted on the optical axis for a transmitted dark field illumination observation, an optical element 6b of the optical element position No. 2 for a transmitted differential interference illumination observation and the optical element 6c of the optical element position No. 3 for the transmitted phase contrast illumination observation. Further, no optical element is required for the transmitted bright field illumination, transmitted polarizing illumination, etc., so that some optical elements are not mounted at any of the optical element positions 4, 5 and 6.

After the position of the optical element is determined, a corresponding control instruction is sent to the condenser control section 33 as in the case of the condenser top lens unit 7. Upon receipt of an instruction from the main controller section 30, the condenser control section 33 controls the driving circuit 42, thus driving the condenser optical element unit 6 and inserting the designated optical element on the optical axis.

(3) Brightness Adjustment

Figure 20:
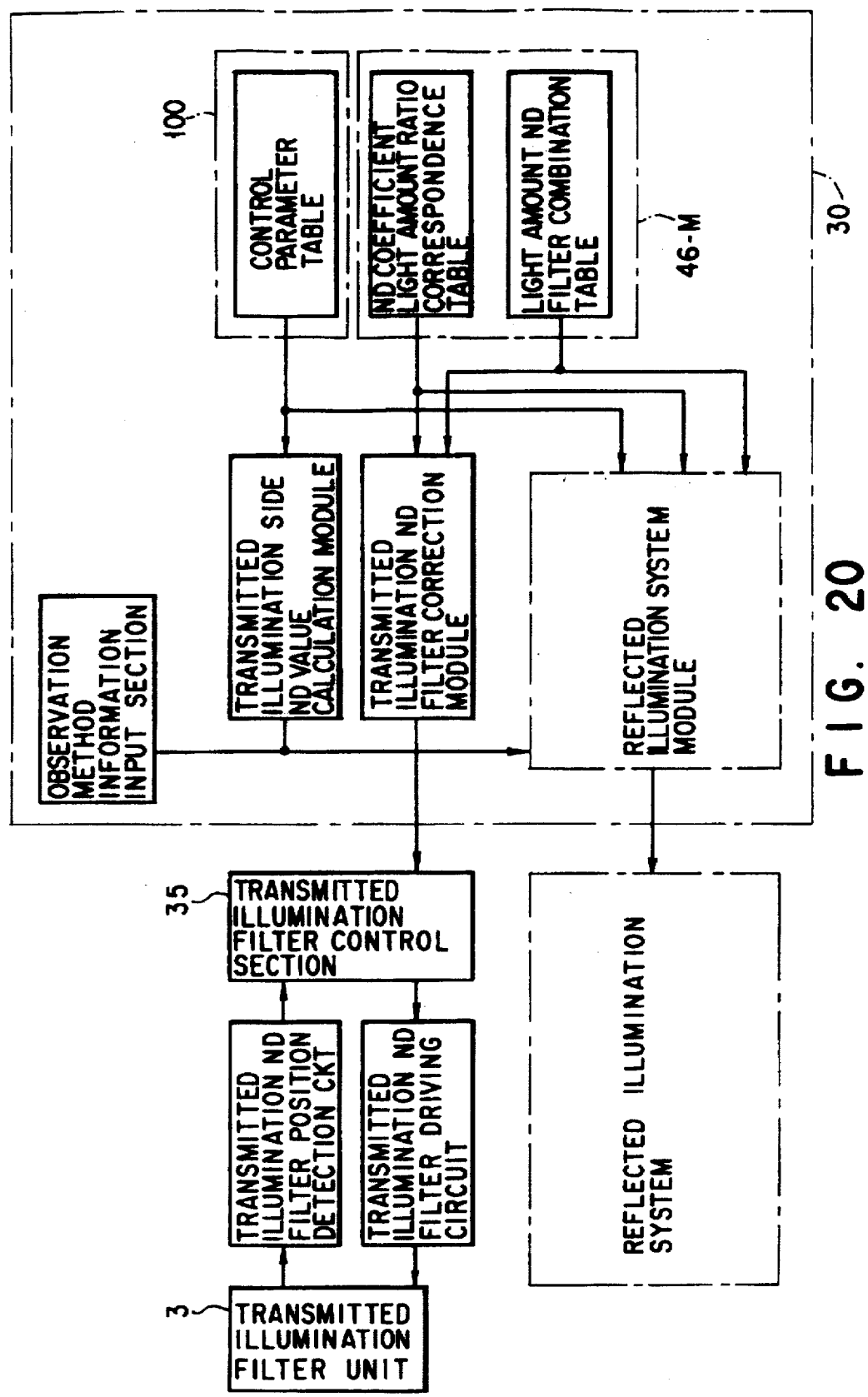
FIG. 20 is a function block diagram relating to the correction of filters (brightness)

FIG. 20 shows a function block diagram relating to a brightness adjustment section. A transmitted illumination side ND value calculation module, transmitted illumination side ND filter correction module and reflected illumination module constitute function blocks realized by executing predetermined steps in the flow chart as shown in FIG. 9.

The brightness of the transmitted illumination side light is adjusted by varying a combination of a plurality of ND filters mounted on the transmitted illumination filter unit 3 and the brightness of the reflected illumination side light by varying a combination of a plurality of ND filters mounted on the reflected illumination filter unit 16. The reflected illumination system module comprises, as the transmitted illumination system, a reflected illumination side ND value calculation module and reflected illumination side ND filter correction module.

FIG. 21 shows a table indicating various kinds of filters mounted on the transmitted illumination filter unit 3 and the corresponding mount positions. No. 01 to No. 4 ND filters are used to control the brightness without varying the color temperature. It is possible to adjust an amount of transmitted light under the combination of four filters and control the light amount. The position of No. 5 filter corresponds to a color temperature correction filter for correcting the color temperature when use is made of the color filter, the position of No. 6 to a contrast enhanced filter for enhancing the contrast when use is made of a black-and-white film and the position of No. 7 filter to a specific color enhancing filter for enhancing a specific color. Any of these filters is insertable on the illuminated optical path by the transmitted illumination filter control section 35 controlled by the main controller section 30. The filter kind table on the transmitted illumination filter is stored in the nonvolatile memory 100.

FIG. 22 shows a table representing combinations of No. 1 to No. 4 filters and light amount ratios. It is to be noted that the light amount ratio represents a ratio of light reduction from a reference value, that is, a reference value obtained with the ND filter not inserted. For a combination under No. 8 in FIG. 22, it means the passage of the light amount 1/128 relative to a light amount when the ND filter is not inserted. Such a light amount ratio-ND filter combination table is stored in the nonvolatile memory 100.

An optimal illuminance L as looking into the sample via the eyepiece 14 is about 0.5 to 1 [1x]. The aperture stop is considered as being standard when the pupil's diameter is 80 to 85 [%] for the transmitted bright field illumination. The illuminance L on the image surface at observation can be expressed as $$L=\{Kk(LA \times ND \times AS) \times OB\} \times Km \quad (1)$$

for the transmitted illumination microscopy and $$L=\{Kk(LA \times ND \times AS)\} \times Km \quad (2)$$

for the reflected illumination microscopy.
where

LA: the image illuminance (standard illuminance) at an AS diameter 100% with a standard objective, LA differing depending upon the illumination optical system;

ND: the density ratio under a combination with the transmitted illumination filter unit 3 or the reflected illumination filter unit 16. For example, under the fifth combination from above in Table (FIG. 22) ND=1/16 when the ND alone is inserted;

AS: the brightness ratio at 100%=1. For example, the ratio AS at the pupil's diameter 80% is $$AS=0.80^2 \quad (3)$$

OB: the brightness ratio inherent in the respective objective at the reference objective=1;

Km: the manual correction value of the NA filter; and

Kk: the correction coefficient at the respective observation method. The brightness at the respective observation method is defined by varying this value.

According to the present embodiment, the definition LA=9361×[1x] is used and, in order to maintain the adjustment target value of the image surface's illuminance L at 0.5 to 1.01×[1x], the target value $$L=0.5 \times (2)^{1/2} \times 2^{\pm 1/4} = 0.707 \times 2^{\pm 1/4} \quad (4)$$

is used and, from the equation (1), $$0.707 \times 2^{\pm 1/4} = \{Kk(936 \times 0.64 \times ND) \times OB\} \times Km \quad (5)$$

Rearranging this for the ND expression, $$ND=(0.707y(Kk \times 936 \times 0.64 \times OB \times Km)) = (1.18 \times 10^{-3})y/(Kk \times OB \times Km) \quad (6)$$

Thus the target value of the ND filter is determined.

Incidentally, those filters inserted into the transmitted illumination filter unit 3 are comprised of a combination of four ND filters as seen from FIGS. 21 and 22 and the target value of ND in the equation (6) has to be given with a resolution of $2^{1/4}$ for control.

In the equation (6), if the logarithm is taken with a base-a, it becomes $$\log_a ND = -38.9 - \log_a OB - \log_a Kk - \log_a Km \quad (7)$$

In order to find an actual ND filter combination, the transmitted illumination side ND value calculation module takes the objective brightness coefficient logaOB (from the control parameter table in FIG. 15), observation method's brightness coefficient logaKk and brightness manual correction value logaKm. The logaND is calculated by substituting these into the equation (7). The logaND is applied to the transmitted illumination filter correction module. The transmitted illumination filter correction module finds the light amount ratio corresponding to the logaND from the ND coefficient versus light amount ratio correspondence table (FIG. 23) initially stored in the ROM 46-M. Then such an ND filter combination as to provide the light amount ratio above is found from the light amount ratio versus ND filter combination table. In order to provide its found combination, an instruction is supplied to the transmitted illumination filter control section 35 of the transmitted illumination filter unit 3.

Upon receipt of a control instruction from the main controller section 30 via the dedicated serial bus 37 the transmitted illumination filter unit 3 changes an ND filter combination so as to obtain a designated combination with a driving circuit 42.

Thus with the ND filter the illumination light is adjusted to a desired brightness level.

In the reflected illumination system the brightness control of the illumination light is performed by the reflected illumination system module. The reflected illumination system module finds the ND value with the use of the equation (2), determines the light amount ratio corresponding to the found ND value with the use of the table as shown in FIG. 23 and finds the ND filter combination for realizing this light amount ratio with the use of the table as shown in FIG. 22.

(4) Adjustment of the Field Stop

FIG. 24 shows a function block diagram relating to the FS-stop control. An FS diameter calculation module and AS diameter calculation module provide the function realized by executing predetermined steps in a flow chart as shown in FIG. 9 by the CPU 45-M.

The method for calculating an actual field stop diameter is as follows.

The transmitted illumination field stop diameter calculation equation is represented by the equation (8) and the reflected illumination field stop diameter calculation equation by the equation (9).

$$\text{The transmitted illumination field stop diameter} = \{OCfr/(OBmag \times FSmag)\} \times Ffs \quad (8)$$

$$\text{The reflected illumination field stop diameter} = (OCfr/FSmag) \times Kfs \quad (9)$$

The "OCfr" denotes the field number of the eyepiece 14 and, according to the present embodiment, 26.5 is used. The "OBmag" represents the magnification of the objective and reference is made to the control parameter table (FIG. 15) for the magnification of the objective currently selected. The "FSmag" represents the projection magnification of the FS image and differs depending upon the condenser top lens currently used. The data of the FS image projecting magnification (FSmag) is initially stored, together with the execution program, in the ROM 46 in the main controller section 30 and provided as the top lens kind table as shown in FIG. 25. According to the present embodiment, calculation is made with the FS projection magnification as shown in FIG. 25.

For a normal case (transmitted bright field illumination), the field stop is so adjusted as to provide a circumscribed field of the eyepiece 14. Since the optimal condition differs depending upon the observation method, it is possible to control the observation method and per-objective intrinsic stop value by varying the Kfs in accordance with the observation method and on the per-objective basis and determining a stop diameter.

Even if the observer freely adjusts the field stop, the Kfs value can be varied, so that adjustment is made to a desired stop diameter for each objective in accordance with the observation method.

In the case where the objective of 4X is used for the transmitted bright field illumination observation, the FS diameter calculation module takes the objective magnification (OBmag) and field stop coefficient (Kfs) from the control parameter table (FIG. 15) and the FS projection magnification (FSmag) from the top lens kind table and calculates an actual FS diameter by substituting these data items into the equation (8).

The transmitted illumination field stop diameter $$= \{OCfr/(OBmag \times FSmag)\} \times Ffs \quad (10)$$
$$= \{26.5/(4 \times 0.85)\} \times 1.0$$
$$= 7.79 \text{ (mm)}$$

The actual FS diameter is found from the equation (10). The field number OCfr of the eyepiece uses 26.5 as the intrinsic value. The field number OCfr is initially set in a program stored in the ROM 46-M. Further, the FS diameter calculation module takes the information of the currently selected objective from the frame control section 36 and utilizes it for the selection of the OBmag.

The FS diameter calculation module sends an instruction (FS diameter data) to the transmitted illumination field control section 34 so that the transmitted illumination field stop 4 becomes thus found FS diameter. Upon receipt of the data via the dedicated serial bus 37 the transmitted illumination field stop control section 34 drives the driving circuit 42 to update the FS diameter.

In the case where the reflected illumination field stop 18 is to be controlled, the FS diameter calculation module finds, from the equation (9), an optimal FS diameter of the field stop 18 located in the reflected illumination system and instructs the found FS diameter to the reflected illumination stop control section 31. Since the field number OCfr and field stop projection magnification (FSmag) can be handled as the fixed values, they are set in the program initially stored in the ROM 46-M.

(5) Adjustment of the Aperture Stop

Finally, the aperture stop is controlled so as to adjust the contrast of the sample. The aperture stop value is determined from equations (11) and (12) given below.

$$\text{The transmitted illumination aperture stop} = 2 \times OBna \times CDf \times Kas \quad (11)$$

$$\text{The reflected illumination aperture stop} = 2 \times OBna \times OBfb \times ASmag \times Kas \quad (12)$$

The "OBna" represents the numerical aperture of the objective and has an intrinsic value for each objective. The "CDf" represents a focal distance of the condenser top lens used and has a correction coefficient. By varying the values it is possible to set the respective observation method and per-objective intrinsic stop value. Although, for the transmitted illumination field observation, the aperture stop diameter of about 80% is explained above as being an optimal state, the optimal value is also varied depending upon the observation method. For the transmitted dark field illumination and transmitted illumination phase contrast observation, for example, it is normal practice to provide a mechanically marginal opening because no aperture stop is necessary. If it is set incompletely, then it is not possible to obtain an optimal observation state. For the transmitted dark field illumination and transmitted illumination phase contrast observation, the "Kas" is set infinite to provide a mechanically marginal opening value. The "OBfb" represents a back focal distance of the objective and it is calculated as a fixed value of 8.00 (mm). The "ASmag" represents the AS projection magnification and is stored, together with the "OBfb", in the ROM 46 in the main controller section 30.

An explanation will be given below an example in which the objective of 4X is inserted on the optical path with the transmitted bright field illumination observation designated. The AS diameter calculation module reads, from the control parameter table (FIG. 15), the numerical aperture (OBna) and AS correction coefficient (Kas) of the currently selected objective and, from the top lens kind table (FIG. 25), the focal distance (CDf) of the top lens. Using these data items, the aperture stop diameter is found from the equation (11).

Transmitted illumination aperture stop $$= 2 \times OBna \times CDf \times Kas \\ = 2 \times 0.16 \times 41.7 \times 0.64 \\ = 8.54 \text{ (mm)} \tag{13}$$

The actual AS diameter is found from the equation (13). In order to control the transmitted illumination aperture stop 5 to the thus found AS diameter, the AS diameter calculation module sends data to the condenser control section 33. Upon receipt of the data via the dedicated serial bus 37 the condenser control section 33 drives the driving circuit 42 to update the AS diameter.

In the case of controlling the stop diameter of the reflected illumination aperture stop 15, the AS diameter calculation module finds the aperture stop diameter from the equation (12) and sends the found stop diameter to the reflected illumination stop control section 31.

The switching of the observation method is effected by the operations (1) to (5).

Figure 8:
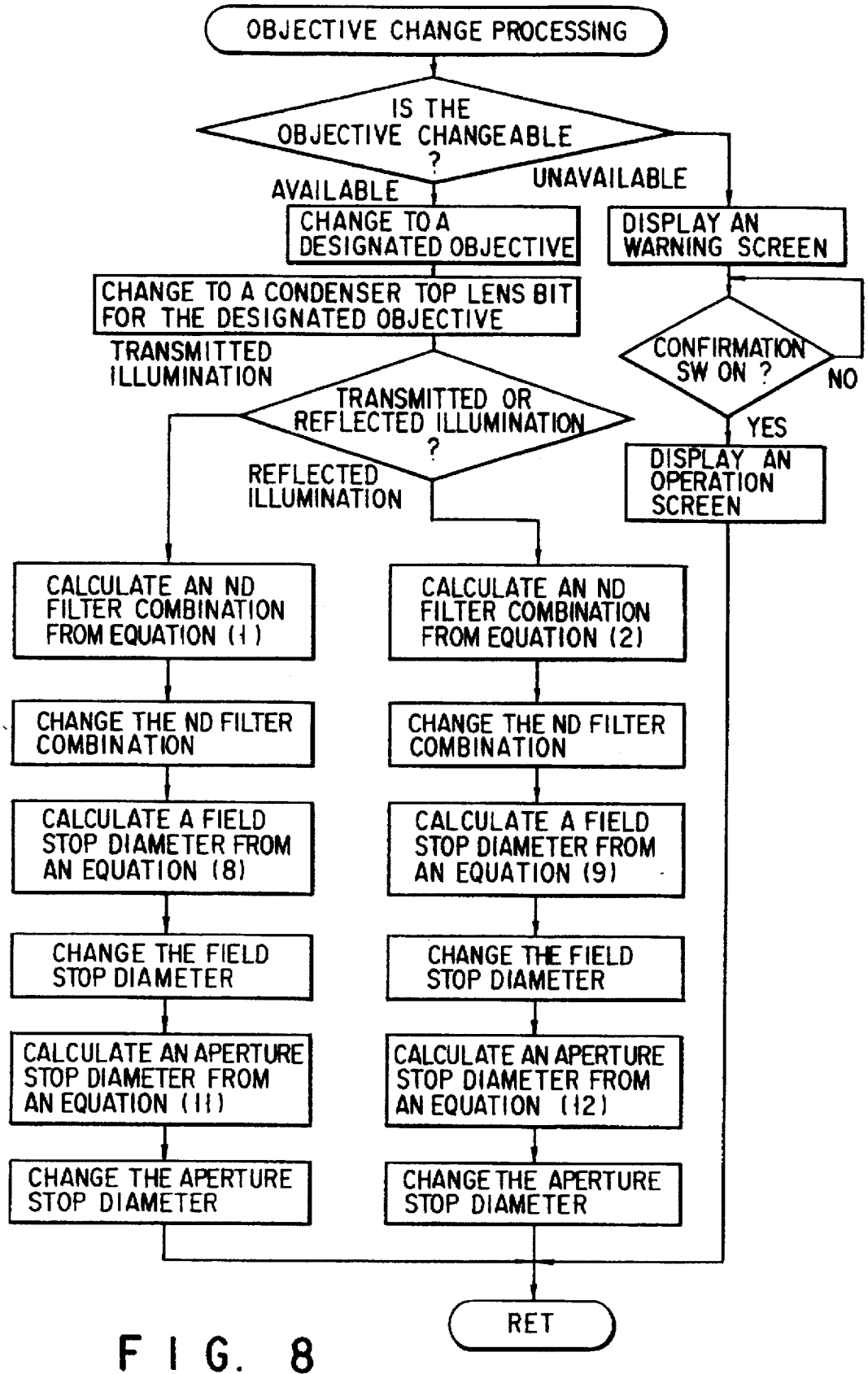
FIG. 8 is a flow chart showing objective change processing of the first embodiment.

The objective switching processing will be explained below by reference to FIG. 8 when any SW is depressed on the display area 330 with the operation screen displayed on the display screen 102.

Let it be assumed that an observation is made under the differential interference microscopy in the case where an objective lends of 40X is used with the revolver 9 located to the revolver position No. 4 site. In such an observation state, an explanation will be given below about the operation when the objective designation SW 331 is depressed on the display area 330.

The CPU 45-M of the main controller section 30 recognizes the depression of the objective designation SW 331 from the display content of the SW input section 101 and display section and starts the change operation of the objective lens. The CPU 45-M refers to the control parameter table (FIG. 15) to check whether or not the designated objective is usable in the current observation method.

The current observation method is for the transmitted illumination differential interference and cannot be set by the designated objective. In this case, the CPU 45 suspends the change operation and displays a warning screen on the display section 102 as shown in FIG. 26. The observer confirms the warning content on a warning display area 360 and, by depressing the confirmation SW 361, can bring the content of the display section 102 back to the operation screen.

If an objective is selected as one usable under the current observation method (the 10-X objective SW 332, etc., at the revolver position No. 2), the revolver 9 is rotated and the objective change operation is performed. Based on the control parameter table (FIG. 15), the CPU 45-2 finds the brightness optimal to the changed objective, stop diameter (transmitted illumination field stop 4, transmitted illumination aperture stop 5) and its combination with the condenser from the equations (1), (8) and (11) and drives the corresponding unit for control.

Further, the reflected illumination selection SW 321 is depressed on the display area of the display section 102 and, as the switching operation from the transmitted illumination observation method to the reflected illumination observation method, control is made in the same steps (1) to (5) as set out above and the switching of the illumination system (observation method) is carried out.

Those numerical values on the control parameter table (FIG. 15) are standard values at the time of initialization but the brightness adjustment value by the ND allows manual correction to be made for each observation method and it can be finally adjusted to the liking of the user. For example, the current set value of the manual correction value (logaKm) for the transmitted bright field illumination is "0" according to the Table (FIG. 15) and is set in no manual correction state.

Here, if the brightness is changed to one half its level by the manual correction mechanism, not shown, of the transmitted illumination filter unit 3, the transmitted illumination filter control section 35 informs its effect to the main controller section 30 via the dedicated serial bus 37. By the data from the transmitted illumination filter control section 35, the main controller section 30 changes, at the bright field time, the manual correction coefficient (Km) of the control parameter table from "0" to "–4". Thereafter, in the case where the bright field observation is designated, calculation is made with the use of that changed manual correction coefficient (Km) and, in the bright field observation method, the brightness is adjusted to one half the standard value. If there is a manual correction even in the case of the transmitted field illumination stop 4, transmitted illumination aperture stop 5, reflected illumination field stop 18 and reflected illumination aperture stop 19, the stop data (Kfs or Kas) of the corresponding objective under the corresponding observation method is updated (see FIG. 15). By doing so, it is possible to individually set the stop diameter of the objective corresponding to the respective observation method. Further, the illumination light source lamp voltage (Lvol) can also be stored and reproduced for the respective observation method.

According to the first embodiment, it is not necessary to effect the change and adjustment of the illumination system, as well as the adjustment of the field stop and aperture stop, which have so far required a cumbersome operation and a skill at the time of switching the observation method. By doing so, it is possible to obtain a best observation image at all times even at the time of switching the observation method and to provide an improved operation.

Further, it is possible to reproduce every detail of delicate adjustment values to the observer's liking by storing and reproducing the brightness correction values at the illumination system for each observation method as well as the field stop and aperture stop for each objective under the respective observation method.

(Second Embodiment)

The second embodiment of the present invention will be explained below.

The second embodiment comprises adding a microgram taking apparatus and autofocusing apparatus to the first embodiment as set out above.

Figure 27:
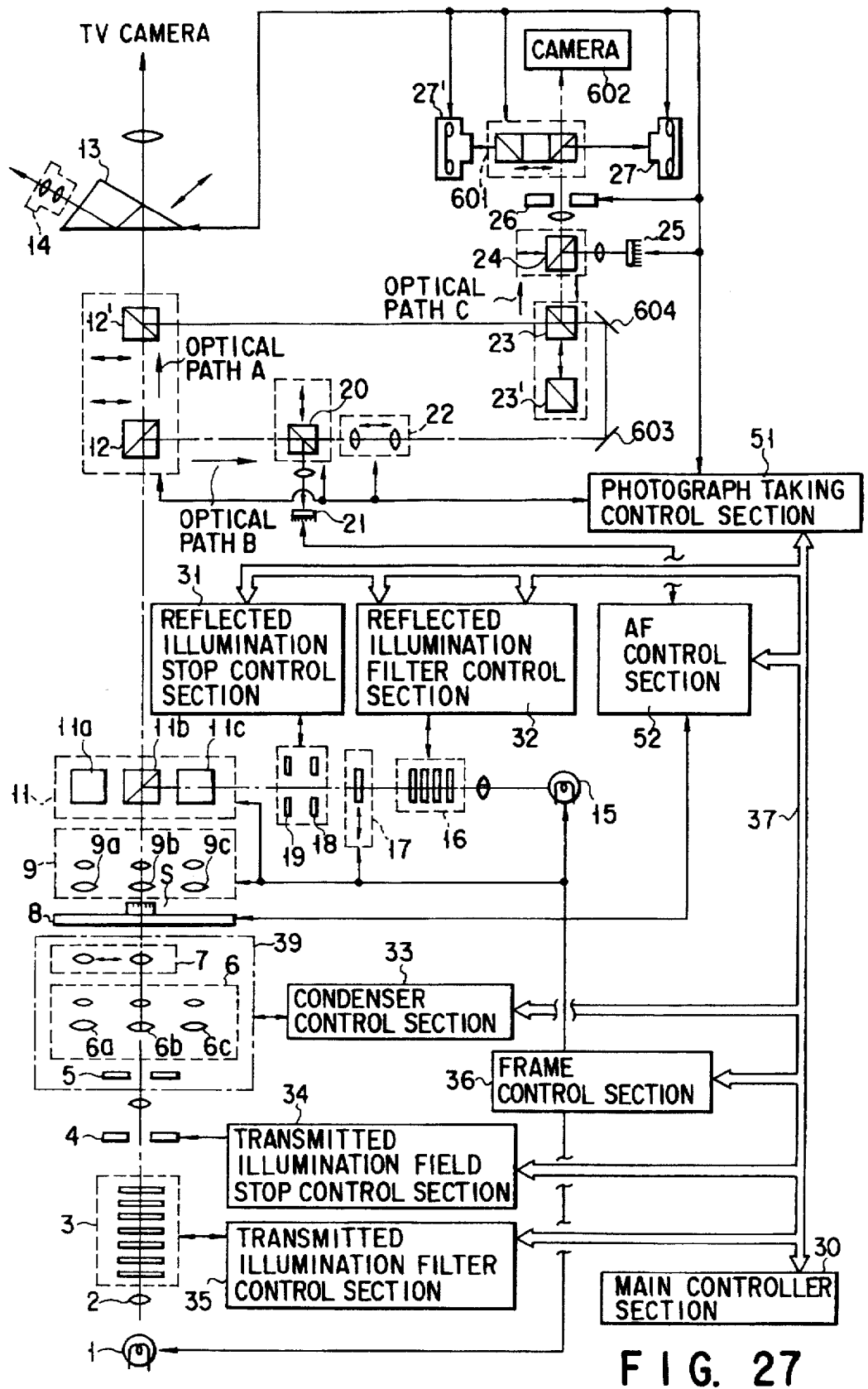
FIG. 27 is a view generally showing a microscope apparatus according to a second embodiment of the present invention.

FIG. 27 shows a general arrangement of the microscope apparatus according to the second embodiment. The illumination optical system of this microscope apparatus is constructed in the same arrangement as set out in the first embodiment.

Optical path switching prisms 12, 12' are arranged in a serial way on an optical path between a cube unit 11 and an observation prism 13. The prisms 12, 12' are arranged in a mechanically interlocking relation and both can be inserted at a time onto the optical path. The optical path switching prisms 12, 12', being so inserted, have their optical axis conducted to a photograph taking optical system.

An AF switching prism 20 and zoom lens 22 are arranged on the optical axis of an optical path B (photograph taking optical system) switched by the optical path switching prism 12. The AF switching prism 20 is detachably inserted onto the optical path B and allows an observation image to be projected to a focus detection light receiving element 21 upon the insertion of it onto the optical path. The focus detection light receiving element 21 picks up an observation image for autofocusing control and, at the insertion of the AF switching prism 20, picks up that observation image through an imaging lens.

The zoom lens 22 allows the magnification to be continuously varied upon photographing and observation. In the present embodiment, it is possible to freely select a zoom magnification of 1X to 2X. Total reflection mirrors 603, 604 are arranged to allow the light which passes through the zoom lens 22 to be turned toward the optical axis direction.

A photograph taking optical path switching prism 23 insertable on the photograph taking optical system (optical path B) is arranged on the optical path between a total reflection mirror 604 and the optical path switching prism 12' inserted on the optical path. A light measuring optical path switching prism 24 is arranged as an insertable prism on the optical axis of a photograph taking path (optical path C) when the photograph taking optical path switching prism 23 is inserted on the optical axis. A photograph taking prism 23' is inserted on the optical axis only at the photograph taking time and secures such a path as to enable the light amount ratio of an observation image incident to the camera to become 100%. A photograph taking side light receiving element 25 is arranged at a position to allow light which is conducted from the light measuring optical path switching prism 24 to be incident through an imaging lens and is adapted to detect an amount of light used for automatic calculation of an exposure time upon the taking of a photograph.

A photograph taking shutter 26 and a plurality of cameras 27, 27' and 602 with a photograph taking film loaded therein are arranged on the optical axis (optical path C) of the light reflected on the photograph taking optical path switching prism 23 inserted on the optical path B. The plurality of cameras can be freely selected in accordance with the moving position of the camera switching prism 601. The optical axis of the photograph taking optical system (optical path B) has its light conducted at the optical path switching prism 12' to the observation prism 13 as in the first embodiment to allow an observation to be made with an imaging lens 14.

The light path switching prisms 12, 12', light measuring optical path switching prism 24, picture taking prism 23' and camera switching prism 601 are of a total reflection type and, upon being inserted on the optical axis, allow their light amount to be 100% branched. The AF switching prism 20 and photograph taking optical path switching prism 23 are of a light amount ratio splitting type and, if being inserted, splits the optical path at a ratio determined for each prism. FIG. 28 shows the reflection ratio and light amount splitting ratio of the respective prisms.

An explanation will be given below of the arrangement of a control system for controlling the optical system of the present microscope apparatus. In this embodiment, the same reference numerals are used to designate part or elements corresponding to those shown in the first embodiment and any further explanation is omitted for brevity's sake.

The microscope apparatus of the present embodiment includes a photograph taking control section 51 for controlling the switching of the photograph taking and photograph taking optical system and an AF control section 52 for automatic focus control.

The photograph taking control section 51 performs optical path switching control of the optical path switching prisms 12, 12', AF switching prism 20, photograph taking switching prism 23, light measurement optical path switching prism 24, and camera switching prism 601. It also performs the drive control of the zoom lens 22, calculation processing of calculating a photograph taking time from the light amount of the photograph taking light receiving element 25, open/close control of the photograph taking shutter 26, the winding and rewinding control of the cameras 27, 27' and 602.

The AF control section 52 calculates data from the focus detecting light receiving element 21 and effects an autofocus detection of the sample through the driving of a stage 8 in an optical axis direction. The photograph taking control section 51 and AF control section 52 include a CPU circuit 41 as in other units of the first embodiment and effect the driving and position detection of the optical units. They are also connected to a main controller section 30 and controlled from a control instruction from the main controller section 30.

The operation of the second embodiment will be explained below.

Figure 29:
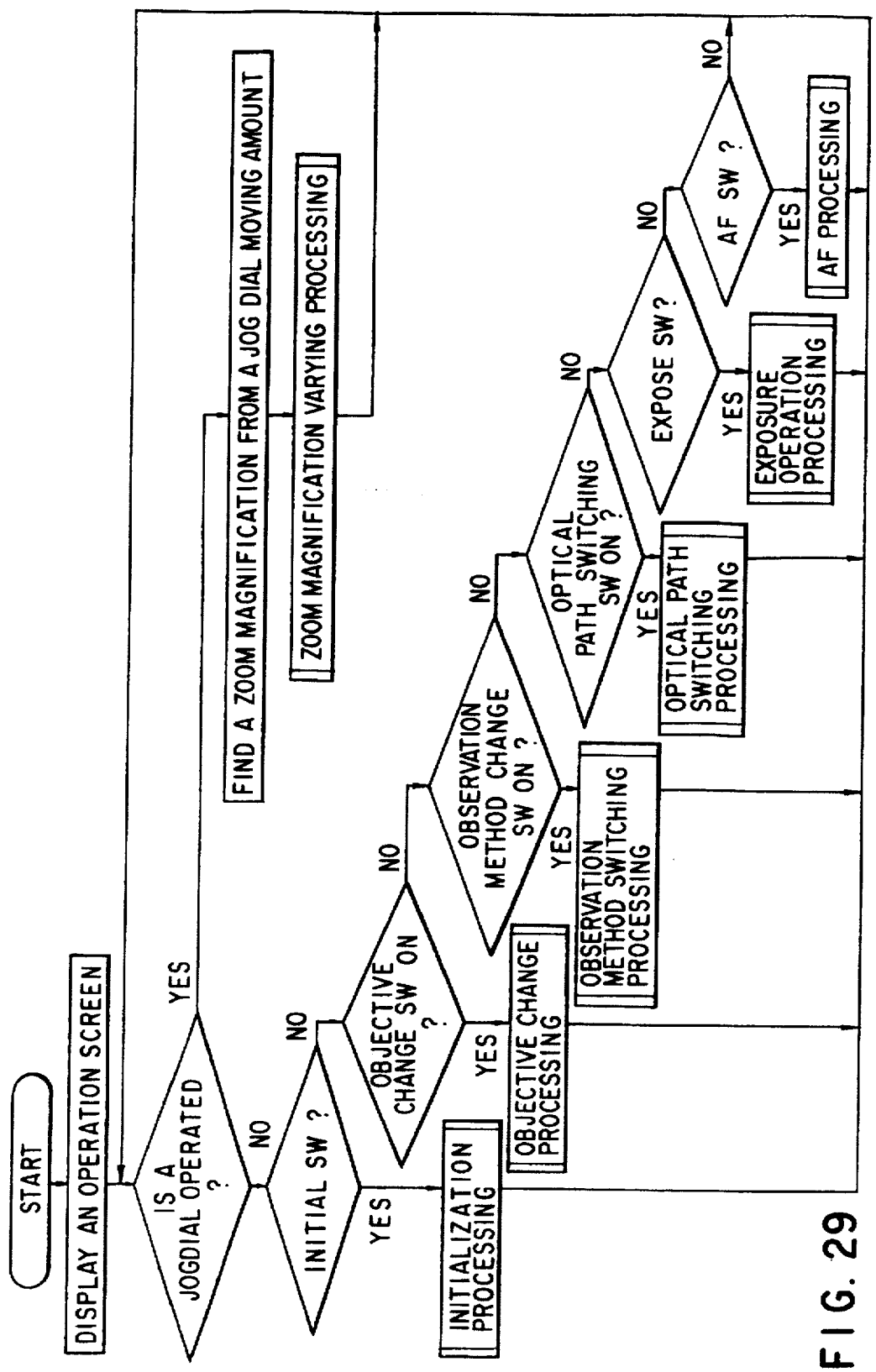
FIG. 29 is a view showing a flow chart of the whole operation of the second embodiment.

FIG. 29 shows an operation flow chart of the present embodiment. The flow chart as shown in FIG. 29 involves an initialization processing (FIG. 30), objective switching processing (FIG. 31), observation method switching processing (FIG. 32), optical path switching processing (FIG. 33), exposure operation processing (FIG. 34), autofocus processing (FIG. 35), zoom magnification varying processing (FIG. 36), etc.

With the power supply ON, the microscope apparatus displays an operation screen. FIG. 37 shows a practical operation screen. The operation screen is displayed on a display section 102 of the main controller section 30. SW display areas 310, 320 and 330 and INITIAL switch 300 are assigned the same functions as the operation screen of FIG. 10. The SW display area 370 includes switches for the switching of the observation optical system and photograph taking optical system. A Bi switch 371 and TV switch 372 are adapted to set an observation site. A DIRECT switch 373, ZOOM switch 374 and ZOOM/PHOTO switch 375 are adapted to designate observation modes.

Figure 30:
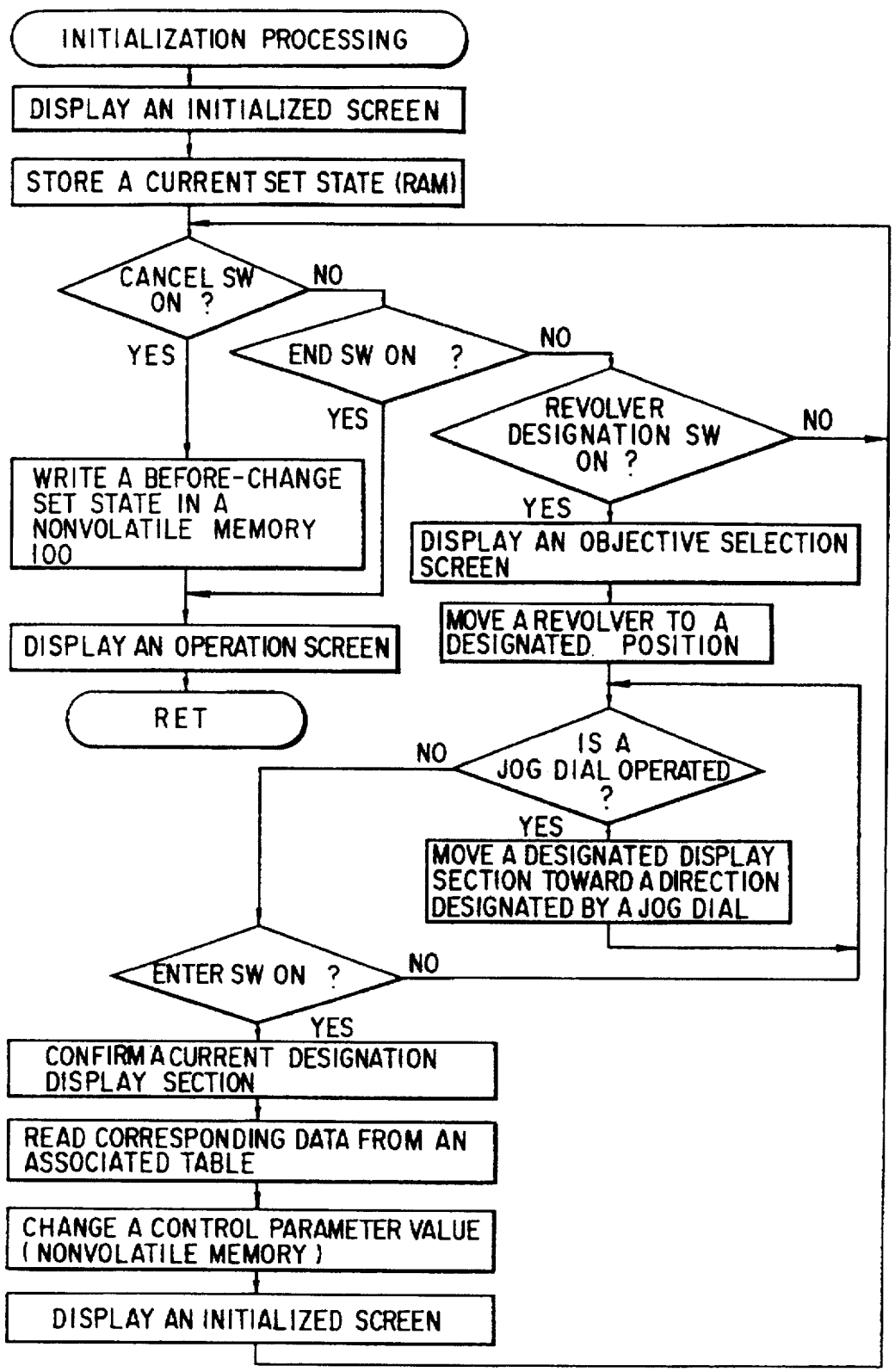
FIG. 30 is a flow chart of initialization processing of the second embodiment.

With the INITIAL switch 300 depressed on the operation screen, the initialization processing is executed in accordance with the flow chart as shown in FIG. 30. In the initialization processing, the initialization screen as shown in FIG. 11 is displayed and a corresponding parameter value of the control parameter table is updated as in the first embodiment. The second embodiment uses the control parameter table as shown in FIG. 39. The table has the same form as the control parameter table of the first embodiment except that a TV optical path manual correction coefficient is registered in a way to correspond to the respective observation method.

Figure 31:
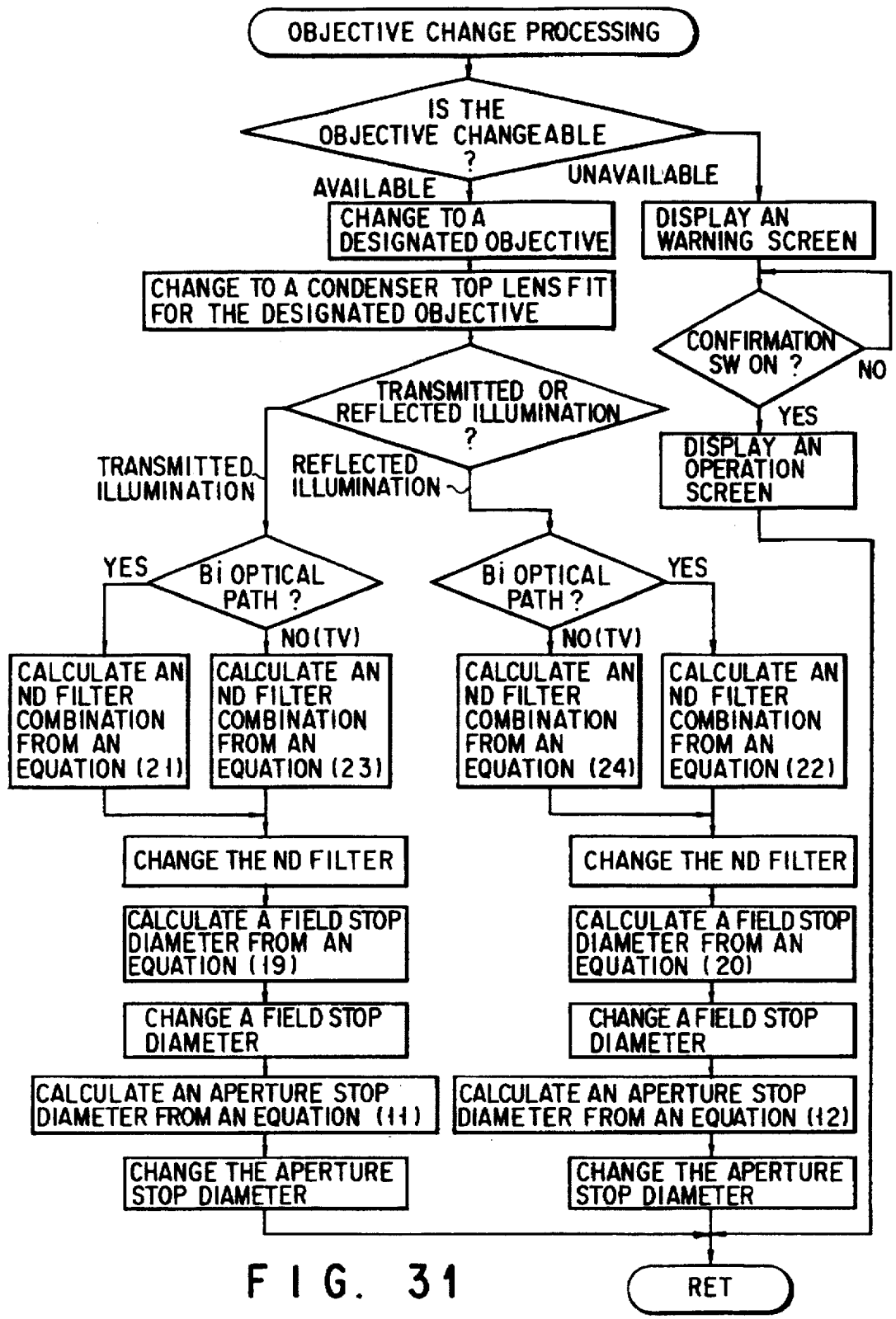
FIG. 31 is a flow chart of objective change processing of the second embodiment.

When the switch on the display area 330 corresponding to the objective switching SW is selected on the operation screen, the objective switching processing is executed in accordance with the flow chart as shown in FIG. 31. In the objective switching processing, checking is made on the control parameter table to see whether or not a change can be made to the designated objective. If an observation is possible, a change is made, under control, to the designated objective lens as in the same way as in the first embodiment. Further, a change is made to a condenser top lens fit for the designated objective, while referring to the control parameter table. Then an optimal ND filter combination is found, by, later-described calculation, in accordance with the designated observation method and set optical path. Further, the stop diameter is controlled on a later-described principle.

When a switch on the display area corresponding to the observation switching SW is selected on the operation screen, the observation method switching processing is executed in accordance with the flow chart as shown in FIG. 32. In the observation method switching processing, checking is made to see whether or not the objective lens is fit for the designated observation method. If it is not fit for the observation method, it is switched to a proper objective while referring to the control parameter table. Further, in the same way as in the first embodiment, a light source is selected in accordance with the observation method, a lamp voltage is set while referring to the control parameter table and the cube, condenser top lens unit and optical elements are selected in accordance with the observation method. Then an ND filter combination corresponding to the observation method and selected optical path (TV optical path or Bi optical path) is found by a later-described calculation. After updating the respective kinds of stops, the automatic exposure mode of the observation method is switched by referring to the control parameter table. These are displayed on the photograph taking condition display area 390.

In the case where the Bi switch 371 is selected the CPU 45-M in the main controller section 30 recognizes from a combination of the SW input section 101 and display section 102 that the Bi switch 371 is depressed, and sends an optical path moving instruction to the photograph taking control section 51. The photograph taking control section 51 inserts the observation prism 13 on the optical axis upon receipt of the instruction from the main controller section 30. By doing so, an observation is possible through the eyepiece 14.

In the case where the TV switch 372 is selected, the CPU 45-M sends an instruction for removing the observation prism 13 away from the optical axis to the photograph taking control section 51 so that an observation is possible with the TV camera, etc.

With the DIRECT switch 373 selected, the CPU 45-M sends an instruction for removing the optical path switching prisms 12, 12' away from the optical axis to the photograph taking control section 51. As a result, an optical path A as shown in FIG. 27 is selected. For a visual observation the optical path A conducts an observation image to the eyepiece 14 not via the photograph taking optical system. Since the light passing through the optical path A is not passed through any extra optical system, there is neither a decrease in the amount of light resulting from the lens nor a degradation in an observation image. Thus this is used for such an observation as set out above.

A zoom 374 is used for the case where a zoom observation is made with the use of a zoom lens 22 of the photograph taking optical system. With the ZOOM switch 374 depressed, a control instruction is sent to the photograph taking control section 51 with the same method as set out above. The photograph taking control section 51 inserts the optical path switching prisms 12, 12' on the optical axis to select the optical path B. With the photograph taking optical path switching prism 23 removed away from the optical axis, an observation is possible with the use of the zoom lens 22. In this connection it is to be noted that the photograph taking control section 51 interrupts a calculation processing of a photograph taking time because no light enters the photograph taking light receiving element 25 due to the photograph taking optical path switching prism 23 being removed away from the optical axis.

A ZOOM/PHOTO switch 375 is adapted to select an optical path for performing the calculation processing of the photograph taking time while performing an observation with the use of the zoom lens 22. With the switch 375 selected, the CPU 45-M sends an instruction for inserting the photograph taking optical path switching prism 23 and light measuring path switching prism 24 on the optical axis to the photograph taking control section 51 to allow light to be conducted to the photograph taking light receiving element 25. This enables an observation to be made while performing the calculation processing of the photograph taking time. In this very ZOOM/PHOTO optical path state, an exposure start SW380 is in a ready state.

In the case where the optical path selected by the DIRECT switch 373 and ZOOM SWITCH 374 is set, since the photograph taking optical path switching prism 23 is removed away from the optical axis, no light enters the photograph taking light receiving element 25 and it is not possible to perform the calculation processing of the photograph taking time. For this reason, the CPU 45-M restricts the SW input section 101, thus inhibiting the ready state of the exposure start SW380. An actual exposure operation will be explained later.

Camera designation switches 376, 377 and 378 are adapted to designate the photograph taking cameras. With a 35L switch 376 selected it is possible to select a camera 27', with an L switch 377 to select a camera 602 and with a 35R switch 378 to select a camera 27. The actual selection operation is performed by switching the camera switching prism 601 to select any of the cameras 376, 377 and 378.

An AF switch 381 is adapted to instruct the starting/ending of an autofocus detection operation. With the AF switch 381 depressed, as shown in FIG. 35, the main controller section 30 is so operated that, in order to input an observation image as a pre-stage operation to the focus detection light receiving element 21, the AF switching prism 20 is inserted on the optical axis to conduct an observation image to the focus detection light receiving element 21. Based on the selected observation method and set optical path (TV optical path or Bi path) an optimal ND filter combination is found by predetermined calculations (equations (21) to (24)) to change an ND filter.

Then the CPU 45-M informs the AF operation start to the AF control section 52 so as to detect an actual focus. Upon receipt of the AF operation start instruction from the main controller section 30 the AF control section 52 enables an AF operation to be started. The AF control section 52 enables a driving circuit 40 to move a sample moving stage in a way perpendicular to the optical axis direction, while gaining the observation data of the focus detection light receiving element, and enables a focus detection operation to be effected while evaluating the variation of the observation image data.

With the AF switch 381 again depressed, the main controller section 30 effects such control as to obtain an action reverse to that at the AF start time. That is, it sends an AF operation ending instruction to the AF control section 52 and, in order to remove the AF switching prism 20 away from the optical axis, sends a corresponding driving instruction to the photograph taking control section 51.

Figure 33:
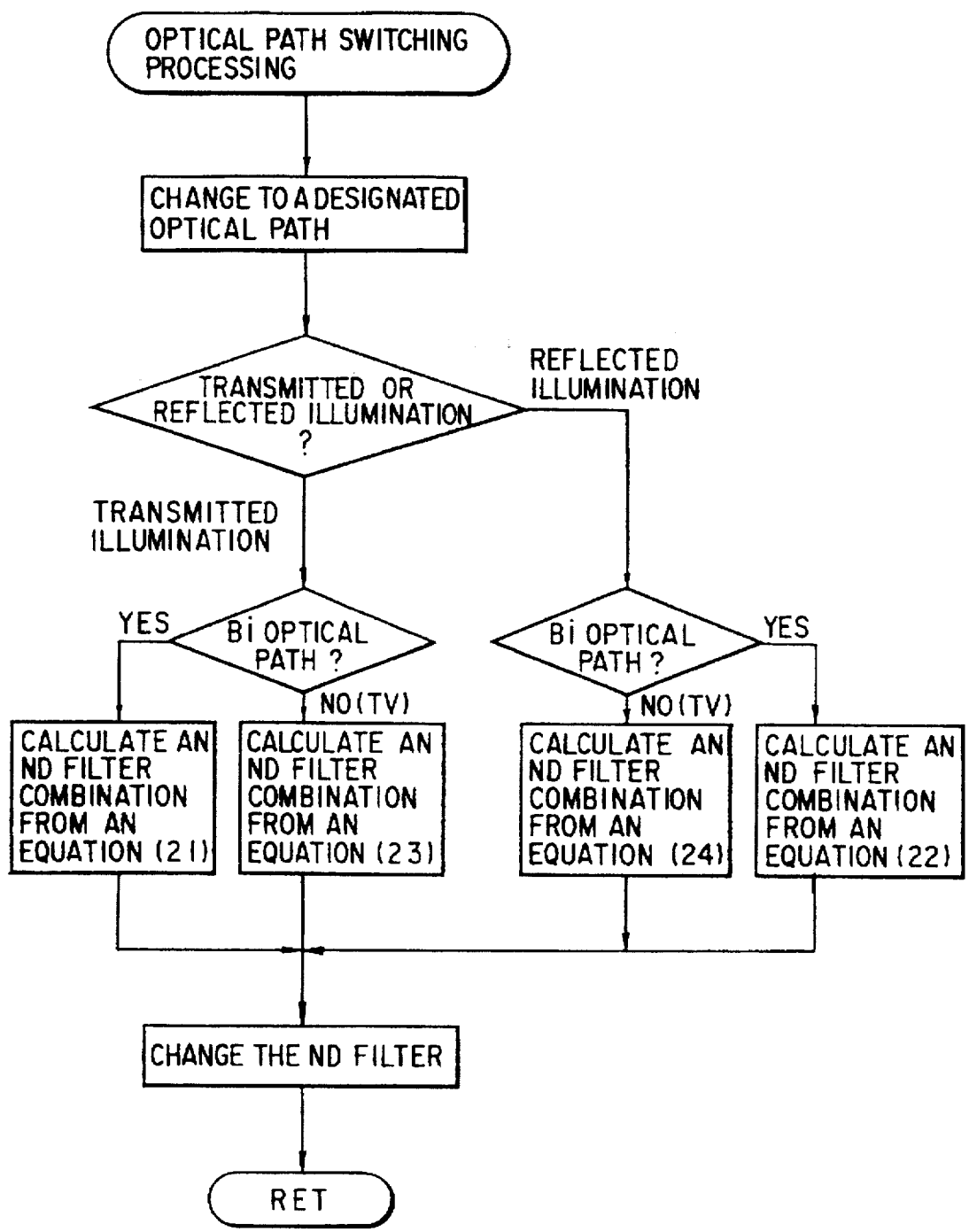
FIG. 33 is a flow chart of optical path switching processing of the second embodiment.

Incidentally, the splitting ratio and selection optical path of each prism varies by the prism switching operation as set out above. This causes a variation in an amount of light exiting toward the eyepiece 14. Conventionally, it has been necessary to, for each optical path switching, adjust the brightness to a level fit for the optical path setting. According to the present invention, the above-mentioned adjusting operation can be alleviated by executing a later-described operation based on the flow chart as shown in FIG. 33.

FIG. 38 shows a practical form of a table relating on the light amount ratio per optical path.

This table has the light amount ratio information of a light amount conducted to the eyepiece 14 in each set optical path as compared against that at the time of selecting the DIRECT optical path (with the optical path switching prisms 12, 12' in the OUT state). The table above is initially stored in the ROM 46-M in the main controller section 30 and, as required, referred to by the CPU 45-M.

Figure 40:
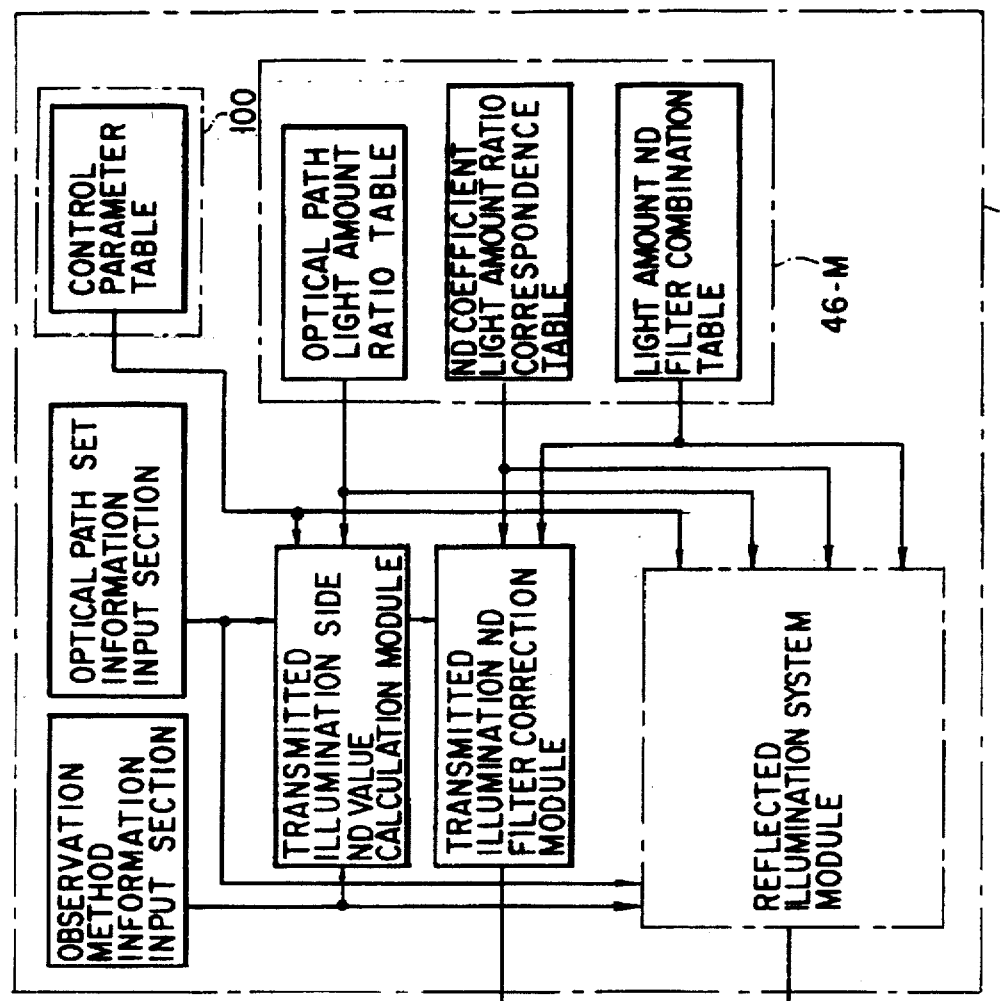
FIG. 40 is a function block diagram relating to the brightness correction of optical path in the second embodiment.

FIG. 40 shows a function block diagram relating to the brightness adjustment for each set optical path. Respective modules in FIG. 40 provide functions realized by executing the flow chart as shown in FIG. 33. For the transmitted illumination a transmitted illumination filter unit 3 is controlled by the transmitted illumination side ND value calculation module and transmitted illumination ND filter correction module. For the reflected illumination the reflected illumination filter unit 16 is controlled by the reflected illumination system modules constructed in a similar way.

The designation of a set optical path is input by switches 371 to 375 on the operation screen. The optical path set information input section recognizes the set optical path by the inputting operation on the switches 371 to 375.

With the optical path switched, the transmitted illumination side ND value calculation module or the reflected side ND value calculation module performs the brightness correction through the utilization of the optical amount correction value (log a Bi) on the light amount ratio table per optical path.

The brightness correction is made by adding the light amount correction value (log a Bi), that is a value registered on the Table (FIG. 38), to the correction equations (1), (2) in the case where the observation method or objective magnification of the first embodiment is converted.

$$L=\{Kk(LA \times ND \times AS) \times OB \times Bi\} \times Km \quad (14)$$

$$L=\{Kk(LA \times ND \times AS) \times Bi\} \times Km \quad (15)$$

In these equations, the Bi represents the light amount ratio varied at the time of switching the optical path and the other parameters are the same as those in the first embodiment. The equation, being so explained as in the equation (7), becomes:

$$ND=-38.9-\log a OB-\log a Kk-\log a Bi-\log a Km \quad (16)$$

The CPU 45-M takes a filter combination corresponding to the ND value, that is a value found from the equation (16), while referring to the table as shown in FIG. 23, and instructs the combination of the taken transmitted illumination filter 3 to the transmitted illumination filter control section 35. This correction operation is performed not only in the case where the observation method and objective magnification are changed but also in the case where a set optical path varies. By doing so, it becomes possible to prevent a variation in an amount of light exiting toward the eyepiece 14 and to make an observation under a constant light amount at all times.

Although, in the first embodiment, the optimal illuminance upon observation through the eyepiece 14 has been explained as being 0.5 to 1 [1X], it is not always optimal in the case where an observation is made with the TV camera for instance with the TV switch depressed and the observation prism 13 removed away from the optical path 13. Since the image pickup element (CCD, etc.) of the TV and the sensitivity of the human eyes differ, there is a possibility that, upon switching, the brightness will vary to an extreme extent. This is also varied greatly when a different TV's image pickup element is used. When switching is frequently made by the observer between the TV and the Bi, it is necessary to make a brightness adjustment operation for each switching. According to the present embodiment the correction factor for observation is incorporated in equations (17) and (18) as a means for avoiding such a situation.

$$L=\{Kk(LA \times ND \times AS) \times OB \times Bi\} \times Kt \quad (17)$$

$$L=\{Kk(LA \times ND \times AS) \times Bi\} \times Kt \quad (18)$$

The Kt represents a correction coefficient for the TV optical path and the other parameters are as shown in the equations (14) and (15). The Kt corresponds to the Km in the equations (14) and (15) and, for the TV optical path and Bi optical path, their individually independent manual correction coefficients are prepared. When the Bi observation is made through the eyepiece 14 (the observation prism 13 is IN), calculation is made with the use of the equations (14) and (15), while at the TV observation time (the observation prism 13 is OUT) calculation is made with the use of the equations (17) and (18). For control, the ND filter combination is found through the switching between the equations (14), (15) and (17), (18) and correction equation, depending upon the respective state. In the flow chart as shown in FIG. 33, in order to find the ND filter combination, equations (21) to (24) are adopted where the zoom magnification is also considered.

The Kt is stored in the nonvolatile memory 100 in the main controller section 30 and referred to as the need arises. The control parameter table as shown in FIG. 39 includes the TV optical path manual correction coefficient Kt.

In the case where manual correction is added also to the TV optical path manual correction coefficient Kt to the observer's liking, the control parameter table is updated so as to correspond to this state. By doing so, it is possible to reproduce the brightness level at all times to the observer's liking. According to the control parameter table, the TV observation is so controlled as to be made double the light amount at the Bi observation time.

Now an actual photograph taking operation will be explained below.

FIG. 42 shows a function block diagram relating to the photograph taking operation. An exposure calculation mode correction module provides a function realized by executing predetermined steps in accordance with the flow chart as shown in FIG. 35.

For the photograph taking operation, a desired objective magnification is selected from the SW display area 330 so as to determine a view angle of a photograph taking sample. Let it be assumed that a 10X objective designation SW (332) is selected. The main controller section 30 performs the brightness adjustment based on the equations (17), (18) or (14), (15) as in the first embodiment. It enables the field stop diameter to be calculated with the equations (8), (9) and the aperture stop diameter to be calculated with the equations (11), (12) and sends a control instruction to the corresponding control section.

After a change is made to the desired objective, a micro-magnification adjustment is made with the zoom lens 22 so as to achieve fine framing. This operation is done by turning the jog dial, not shown, connected to the main controller section 30.

Upon detecting the turning of the jog dial, the CPU 45-M sends a zoom magnification change corresponding to that turning direction to the photograph taking control section 51 for controlling the zoom lens 22. Upon receipt of the zoom magnification change instruction the photograph taking control section 51 moves the zoom lens 22 through the driving circuit 42.

Here, if consideration is paid to an image change resulting from the change in the zoom magnification, for example, an observation image is enlarged by the zoom lens and a range of an observation image identified by the eyepiece 14 is narrowed, so that the stop diameter found with the equations (8) and (9) does not correspond to a 100% value of the observation field. Further, with the enlarged observation image the brightness of the eyepiece 14 is not maintained at 0.5 to 1[1X].

In the present embodiment, therefore, a zoom magnification factor is added as a parameter referred to when the field stop diameter and brightness are controlled. With the addition of the zoom magnification factor the field stop diameter becomes:

Transmitted illumination field stop diameter=$\{OCfn/(OBmag \times Zm \times FSmag)\} \times Kfs$ (19)

Reflected illumination field stop diameter=$\{OCfn/(Zm \times FSmag)\} \times Kfs$ (20)

The "Zm" represents a zoom magnification. The other parameters OCfn, OBmag, FSmag, Kfs are the same as those in the first embodiment. With the addition of the zoom magnification factor the brightness becomes the following equations (21), (22), (23) and (24)

For the Bi optical path, $L=\{Kk(LA \times ND \times AS) \times OB \times Bi \times (1/Zm^2)\} \times Km$ (21)

$L=\{Kk(LA \times ND \times AS) \times Bi \times (1/Zm^2)\} \times Km$ (22)

For the TV optical path $L=\{Kk(LA \times ND \times AS) \times OB \times Bi \times (1/Zm^2)\} \times Kt$ (23)

$L=\{Kk(LA \times ND \times AS) \times Bi \times (1/Zm^2)\} \times Kt$ (24)

Even if the zoom magnification is changed, it is possible to control the brightness and stop diameter to constant ones at all times with the use of the equations above.

Figure 36:
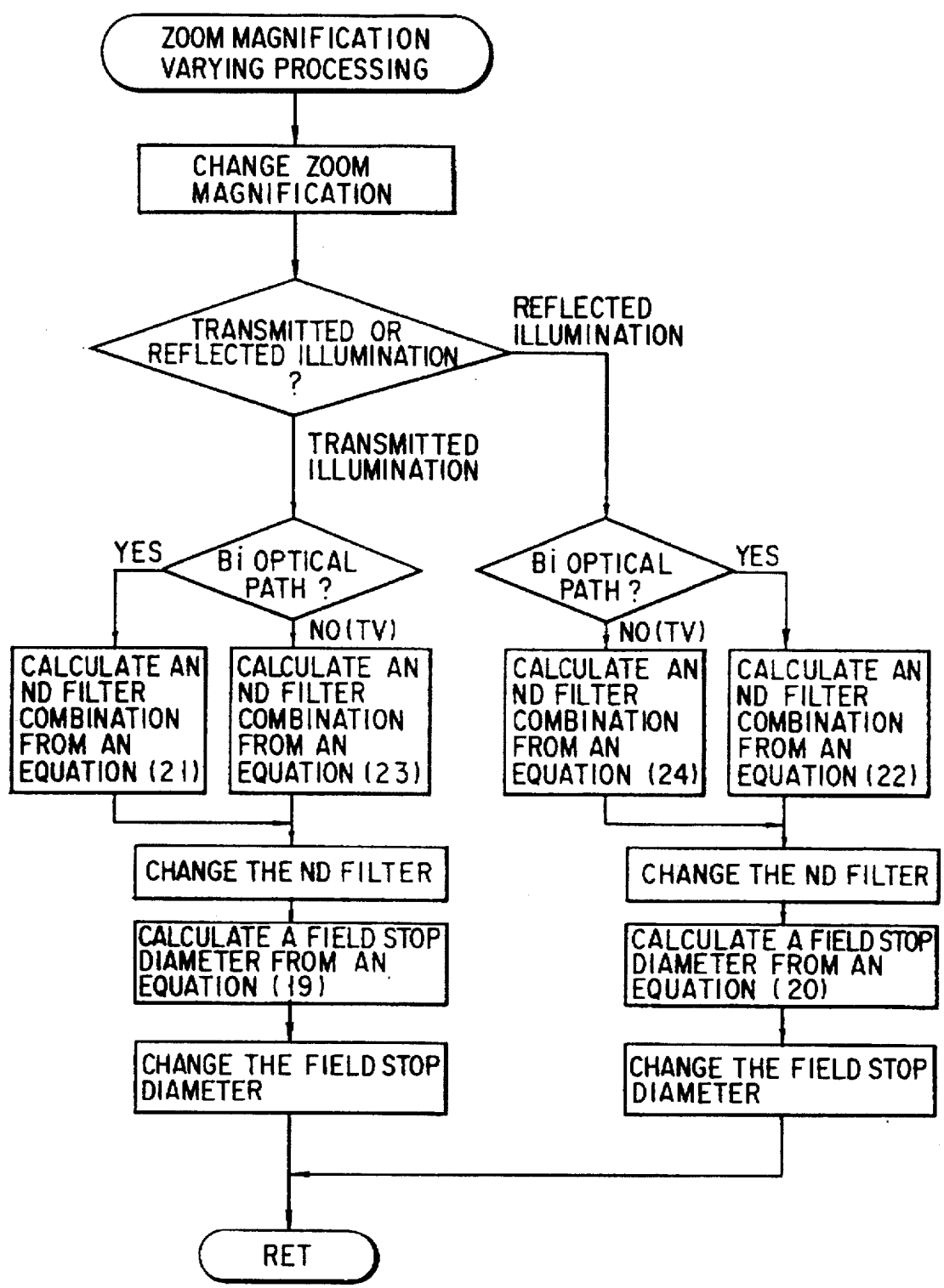
FIG. 36 is a flow chart of zoom magnification varying processing of the second embodiment.

In the present embodiment, if the zoom magnification is changed as shown in FIG. 36, the above equations (21) to (24) are selected based on the observation method and set optical path and an optimal ND filter is found. The ND filter is so controlled as to obtain that found combination. Then the stop diameter is calculated for stop control.

Figure 34:
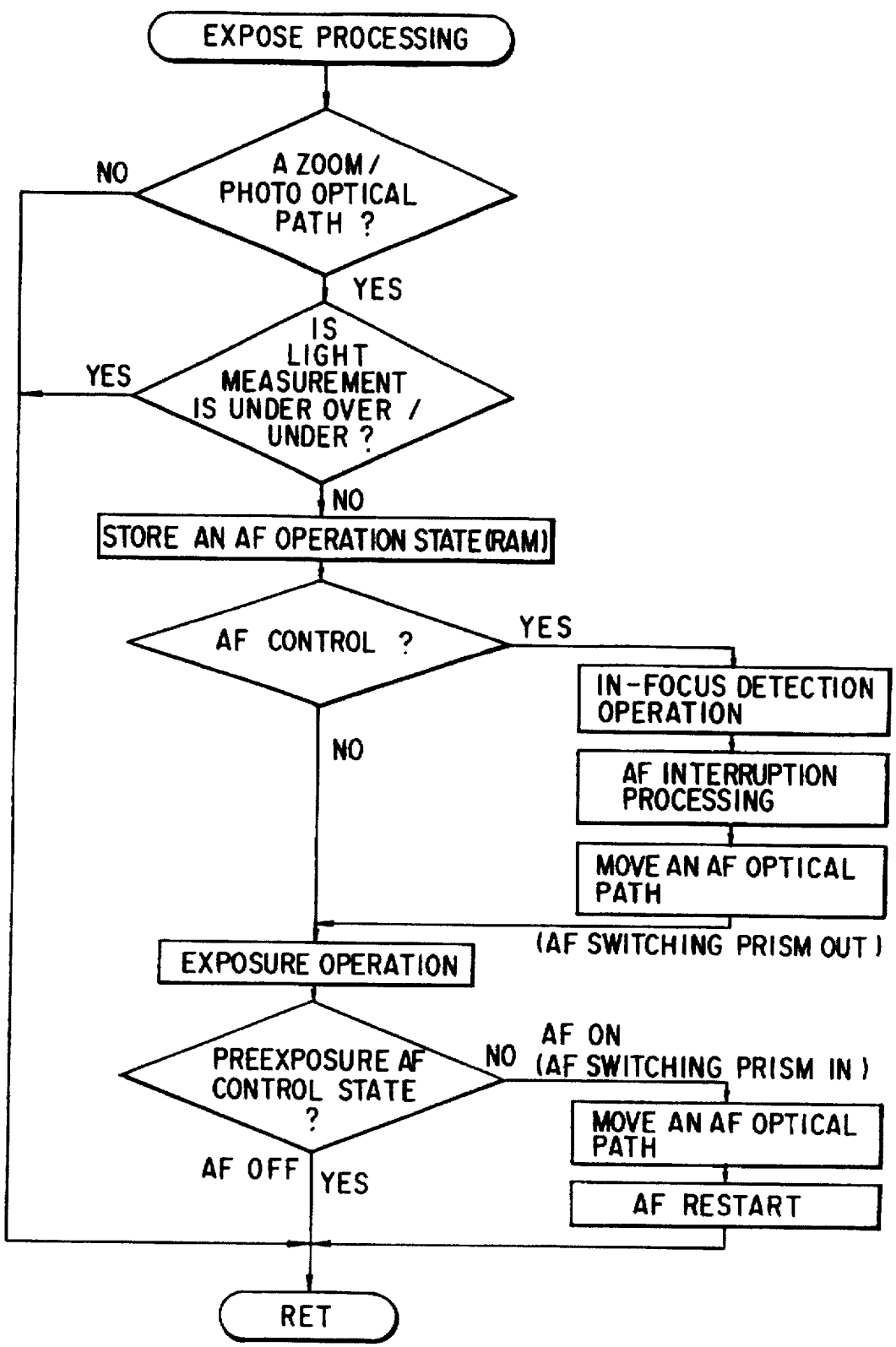
FIG. 34 is a flow chart of exposure processing of the second embodiment.

There are sometimes the cases where, after the determination of the angle of view, focusing is made as required. In this case, focusing adjustment is effected by depressing the AF switch 381. For an actual photograph to be taken, an exposure start SW380 is depressed on the operation screen to perform exposure processing as shown in FIG. 34.

With the exposure start SW380 depressed, the main controller section 30 informs the starting of an exposure from the CPU 45-M to the photograph taking control section 51. The photograph taking control section 51 allows an exposure to be effected with the most recent exposure time under a light measuring calculation done at the so informed time. The light measuring optical path switching prism 24 is removed away from the optical axis and the photograph taking prism 23' is inserted on the optical axis to secure an optical axis path for allowing an observation image to be 100% reached on the camera side.

When the shift of the optical path is finished, the photograph taking shutter 26 is opened to start an exposure to the film of the selected camera. After the lapse of a necessary exposure time, the photograph taking shutter 26 is closed to end a film exposure. When the exposure of the film has been ended, the light measuring optical path switching prism 24 and photograph taking optical path switching prism 23 are inserted and the photograph taking prism 23 is removed away from the optical axis, so that the photograph taking control section 51 is returned back to a pre-exposed optical path state. In this way, the photograph taking operation is finished.

Here, an explanation will be given below about the exposure time (the most recent exposure time upon receipt of an exposure start information) with which the actual exposure operation is effected.

In the case where an observation is effected on the ZOOM/PHOTO optical path, the light entering the photograph taking light receiving element 25 past the light measuring optical path switching prism 24 and imaging lens is detected. The exposure time calculation is carried out based on the amount of light incident on the photograph taking light receiving element 25. In accordance with the calculation mode informed from the main controller section 30 the calculation is carried out in the designated mode.

The exposure calculation mode correction module, while referring to the per-observation calculation mode table (FIG. 41), determines the exposure time calculation mode of an optimal calculation method corresponding to the currently set observation method. The calculation mode table is stored in the nonvolatile memory 100 in the main controller section 30 and referred to if the need arises. Each time the observation method is changed with any of the switches depressed on the SW display area 310 the exposure calculation mode correction module informs a calculation mode corresponding to the observation method to the photograph taking control section 51.

For example, if the transmitted bright field illumination method is set, the photograph taking control section 51 performs calculation based on the "AUTO" calculation mode. Here, if an EPI switch 321 is depressed on the SW display area 320 and an FL switch 315 on the SW display area 310, the CPU 45 in the main controller section 30 optimizes the above-mentioned brightness (ND), field stop and aperture stop. At the same time, the calculation mode corresponding to the changed observation method is informed to the photograph taking control section 51, while referring to the per-observation calculation mode table, and, in this example, an "SFL-AUTO" is so informed.

As a result, the photograph taking control section 51 switches the calculation mode to the "SFL-AUTO" in accordance with a response of the main controller section 30 and enables an examination of the exposure time. Further, the currently set calculation mode is displayed on a photograph taking condition display column 390.

An explanation will be given below of a calculation mode stipulated on the per-observation calculation mode table. The "AUTO" mode represents a calculation mode with a normal bright field sample as a reference and is fit for the light measurement of a sample against a relatively bright background, such as the bright field, differential interference or phase contrast mode. The "FL-AUTO" mode represents a calculation mode with a darker sample, that is a sample darker than the bright field sample, as a target and is fit for the reflected luminescence illumination and dark field observation. The "AFL-AUTO" is the fittest calculation mode to the reflected fluorescence illumination observation and is adapted to determine the distribution and intensity of a fluorescent glow.

It is to be noted that the per-observation calculation mode table can be updated as required and selected on a calculation mode set screen, not shown. It is also possible to make such a change to the observer's liking and, in this case, to update the calculation mode data at the change time.

The second embodiment of the present invention has respective brightness values depending upon the observation image taking areas (the eyepiece and TV camera sites in the present case). It is, therefore, possible to make the optimal brightness correction at the respective observation site's sensitivity and to omit any cumbersome light amount adjustment operation upon the switching of the observation method. It is also possible to avoid taking a wrong photograph resulting from the erroneous setting of the exposure calculation mode and to achieve this by storing the exposure time calculation mode for each observation method and also changing the calculation mode upon the switching of the observation method.

The present invention is not restricted to the above-mentioned embodiments and various changes or modifications can be made without departing from the spirit and scope of the present invention.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A microscope apparatus comprising:

a light source for generating illumination light;

an illumination optical system for illuminating an object to be observed with the illumination light;

an observation optical system for conducting an observation image of the illuminated object to an observation site;

an objective change unit, arranged in the observation optical system, for holding a plurality of objectives and for selectively inserting one of the objectives onto an optical path of the observation optical system;

an optical system controller for independently controlling an optical element arranged in the illumination optical system, and for independently controlling an optical element arranged in the observation optical system, said optical system controller including a frame controller for controlling the objective change unit to insert a given one of the plurality of objectives selected by an observer onto the optical path of the observation optical system;

a recognition unit for recognizing a given one of a plurality of predetermined observation methods which is designated by the observer;

a memory having a table for registering setting conditions of the optical elements which correspond to the respective observation methods, and fit/unfit information indicating whether or not each of the plurality of objectives is fit for the respective observation methods; and a fit determination module operable in accordance with the fit/unfit information registered in the table of the memory for: (i) when the observer designates the observation method, determining whether or not the designated observation method is fit for the selected objective, and (ii) when the observer selects the objective, determining whether or not the selected objective is fit for the designated observation method.

2. The microscope apparatus according to claim 1, wherein:

the optical system controller includes an illumination light controller for controlling ND filters provided in the illumination optical system so as to adjust the illumination light, and a stop controller for controlling a stop provided in the illumination optical system;

the memory has a table for storing brightness conditions of the illumination light corresponding to the respective observation methods; and said microscope apparatus further comprises a brightness correction module operable in accordance with the brightness conditions stored in the table of the memory for, when the observation method is designated by the observer, taking the brightness condition corresponding to the designated observation method, and for delivering to the illumination light controller an instruction for matching the illumination light to the taken brightness condition.

3. The microscope apparatus according to claim 1, wherein:

the optical system controller includes an illumination light controller for controlling the illumination light, a field stop controller for controlling a field stop provided in the illumination optical system, and an aperture stop controller for controlling an aperture stop provided in the illumination optical system;

the memory has a table for storing stop conditions of the field stop and aperture stop corresponding to the respective observation methods; and said microscope apparatus further comprises a stop correction module operable in accordance with the stop conditions stored in the table of the memory for, when the observation method is designated by the observer, taking a stop condition corresponding to the designated observation method, and for delivering instructions to the field stop controller and aperture stop controller for matching the field stop and aperture stop to the taken stop condition.

4. The microscope apparatus according to claim 1, wherein:

the optical system controller includes an illumination light controller for controlling filters provided in the illumination optical system so as to control the illumination light, a field stop controller for controlling a field stop provided in the illumination optical system, and an aperture stop controller for controlling an aperture stop provided in the optical system;

the memory has a table for storing stop conditions of the field stop and aperture stop, and brightness conditions of the illumination light corresponding to the respective observation methods; and said microscope apparatus further comprises: (i) a brightness correction module for, when the observation method is designated by the observer, taking the brightness condition corresponding to the designated observation method from the table of said memory, and for delivering to the illumination light controller an instruction for matching the illumination light to the taken brightness condition, and (ii) a stop correction module for, when the observation method is designated by the observer, taking the stop condition corresponding to the designated observation method from the table of said memory, and for delivering instructions to the field stop controller and aperture stop controller for matching the field stop and aperture stop to the taken condition.

5. The microscope apparatus according to claim 1, wherein:

the illumination optical system includes a reflected illumination optical system for subjecting the object to reflected illumination, and a transmitted illumination optical system for subjecting the object to transmitted illumination;

the optical system controller includes a light source controller for controlling: (i) a reflected illumination light source provided in the reflected illumination optical system for generating reflected illumination light, and (ii) a transmitted illumination light source provided in the transmitted illumination optical system for generating transmitted illumination;

the memory registers, as table data of said table, setting conditions of the reflected illumination light source and transmitted illumination light source corresponding to the respective observation methods; and said microscope apparatus comprises a light source correction module for, when the observation method is designated by the observer, taking the setting condition corresponding to the designated observation method from the table of said memory, and for delivering an instruction to the source controller for matching a light source voltage to the taken setting condition.

6. The microscope apparatus according to claim 1, wherein:

the illumination optical system includes a reflected illumination optical system for subjecting the object to reflected illumination, and a transmitted illumination optical system for subjecting the object to transmitted illumination;

the reflected illumination optical system includes a cube change unit capable of holding a plurality of reflected illumination optical elements, one at a time, which are selectable in accordance with a reflected bright field illumination observation, a reflected dark field illumination observation and a reflected fluorescence illumination observation, and for inserting the selected one of the reflected illumination optical elements onto an optical path of the observation optical system;

a cube change unit controller for controlling the cube change unit to change the reflected illumination optical element which is inserted onto the optical path to another one of the reflected illumination optical elements;

the memory has a cube kind table for storing the setting conditions of the reflected illumination optical elements corresponding to the reflected bright field illumination observation, reflected dark field illumination observation, and reflected fluorescence observation; and said microscope apparatus further comprises a cube correction module for, when the observation method is designated, taking the setting condition of the reflected illumination optical element corresponding to the designated observation method from the cube kind table of said memory, and for delivering to the cube change unit controller an instruction for matching the cube change unit to the taken setting condition of the selected reflected illumination optical element.

7. The microscope apparatus according to claim 1, wherein:

the illumination optical system includes a transmitted illumination optical system for subjecting the object to transmitted illumination;

the transmitted illumination optical system includes a condenser optical element unit capable of holding a plurality of condenser optical elements, one at a time, which are selectable from a dark field observation, a differential interference observation and a phase contrast observation, and for inserting the selected one of the condenser optical elements onto the optical path of the transmitted illumination optical system;

the optical system controller includes a condenser controller for controlling the condenser optical element unit to change the condenser optical element which is inserted onto the optical path to another one of the condenser optical elements;

the memory has an optical element kind table for storing the respective condenser optical elements corresponding to the respective observation methods; and said microscope apparatus further comprises a condenser optical element correction module for, when the observation method is designated by the observer, taking the condenser optical element corresponding to the designated observation method from the optical element kind table of said memory, and for delivering an instruction to the condenser controller for inserting the taken condenser optical element onto the optical path of the transmitted illumination optical system.

8. The microscope apparatus according to claim 2, wherein:

the memory registers, as the table data of said table, a brightness coefficient (Kk) for the respective observation methods, a manual correction value (Km), for the respective observation methods, and a brightness coefficient (OB) indicating inherent brightness levels corresponding to the plurality of objectives, and the memory has a light amount ratio table including a plurality of different light amount ratios and combinations of a plurality of ND filters which are realized by the respective light amount ratios; and the brightness correction module takes the brightness coefficient (Kk) and manual correction value (Km) corresponding to the designated observation method and brightness coefficient-(OB) of the objective used in the designated observation method from the table, finds the light amount ratio from the brightness coefficient (Kk) and manual correction value (Km) of the taken observation method and brightness coefficient (OB) of the corresponding objective, and determines the ND filter combination based on the found light amount ratio from the light amount ratio table.

9. The microscope apparatus according to claim 3, wherein:

the memory registers, as table data of said table, a stop coefficient (Kfs) of the field stop for the respective observation methods and a magnification (OBmag) of the respective objectives, and the memory has a top lens kind table for storing a field stop projection magnification (FSmag) corresponding to a plurality of condenser top lenses; and the stop correction module takes the stop coefficient (Kfs) for the designated observation method and the magnification (OBmag) of the used objective from the table, takes the field stop projection magnification (FSmag) of the used condenser top lens from the top lens kind table, and determines based on the taken stop coefficient (Kfs) and magnification (OBmag), field stop projection magnification (FSmag) and a predetermined field number, a stop diameter of the field stop provided in the transmitted illumination optical system.

10. The microscope apparatus according to claim 3, wherein:

the memory registers, as table data of said table, the stop coefficient (Kfs) of the field stop for the respective observation methods;

the stop correction module takes the stop coefficient (Kfs) for the designated observation method from the table, and determines based on the taken stop coefficient (Kfs), the projection magnification (FSmag) of the field stop provided in the reflected illumination optical system and a predetermined field number (OCfr), a stop diameter of the field stop provided in the reflected illumination optical system.

11. The microscope apparatus according to claim 3, wherein:

the memory registers, as table data of said table, a numerical aperture (OBna) of each of the plurality of objectives, and the memory has a correction coefficient table for storing a correction coefficient (Kas) corresponding to the respective observation methods, and a top lens kind table including the focal distance (CDf) of each of a plurality of condenser top lenses; and the stop correction module takes the correction coefficient (Kas) corresponding to the designated observation method from the correction coefficient table, the numerical aperture (OBna) of the used objective from the table data in the memory and the focal distance (CDf) of the used condenser top lens from the top lens kind table, and determines based on the taken correction coefficient (Kas), numerical aperture (OBna) and focal distance (CDf), a stop diameter of the aperture stop provided in the transmitted illumination optical system.

12. The microscope apparatus according to claim 3, wherein:

the memory registers, as table data of said table, a numerical aperture (OBna) of each of the plurality of objectives, the memory has a correction coefficient table for storing a correction coefficients (Kas) corresponding to the respective observation methods, and the memory stores fixed parameter data including a back focal distances (OBfb) of the objective and a projection magnification (ASmag) of the aperture stop provided in the reflected illumination optical system, the stop correction module takes the correction coefficient (Kas) corresponding to the designated observation method and numerical aperture (OBna) of the used objective from the table and the back focal distance (OBfb) and projection magnification (ASmag) from the fixed parameter data stored in the memory, and determines based on the taken correction coefficient (Kas) and numerical aperture (OBna) and based on the back focal distance (OBfb) and projection magnification (ASmag), a stop diameter of the aperture stop provided in the reflected illumination optical system.

13. The microscope apparatus according to claim 11, wherein:

the illumination optical system includes a transmitted illumination optical system for subjecting the object to transmitted illumination;

the transmitted illumination optical system includes a condenser top lens unit with a plurality of condenser top lenses of different powers mounted therein, said condenser lens unit having a selected one of the condenser top lenses inserted onto an optical path of the transmitted illumination optical system;

the optical system controlling means includes a condenser controller for controlling the condenser top lens unit so as to enable the condenser top lens which is inserted onto the optical path to be changed to another one of the plurality condenser top lenses;

the memory registers, as table data of said table, the setting conditions of the condenser top lenses corresponding to the respective objectives; and a condenser top lens correction module takes the setting condition of the condenser top lens from the table, selects the condenser top lens corresponding to the objective fit for the designated observation method determined by the fit determination module, and delivers an instruction to the condenser controller for matching the condenser top lens unit to the setting condition of the selected condenser top lens.

14. The microscope apparatus according to claim 2, wherein:

the observation optical system includes an observation site for observing an observation image of the object, a direct optical path directly conducting the light of the observation image to the observation site, a bypass optical path formed between a first optical element for taking the light of the observation image from the direct optical path and a second optical element for conducting the light of the taken observation image back to the direct optical path, a light splitting element for taking out a portion of the light of the observation image from the bypass optical path and a photograph taking path for conducting the observation image light taken out of the light splitting element to an image taking site;

the optical system controller includes an optical path controller for forming an optical path extending to the observation site on which the observation image light is incident, by inserting and removing the first and second optical elements and light splitting element onto and from the direct optical path and light splitting element in accordance with an optical path designated from an outside;

the memory has a per-optical path light amount ratio table for storing light amount correction values corresponding to respective optical paths provided by the optical path controller; and the brightness correction module takes the light amount correction value corresponding to the optical path designated by the optical path controller from the per-optical path light amount ratio table and the brightness condition corresponding to the designated observation method from the table, and determines the ND filter combination based on the taken light amount correction value and brightness condition.

15. The microscope apparatus according to claim 2, wherein:

the observation optical system comprises an observation site for observing an observation image of the object, a direct optical path directly conducting the light of the observation image to the observation site, a bypass optical path formed between a first optical element for taking out the light of the observation image from the direct optical path and a second optical element for conducting the light of the taken observation image back to the direct optical path, a light splitting element for taking out a portion of the observation image light, and a photograph taking optical path for conducting the taken observation image light to a photograph taking site;

the memory registers, as table data of said table, a brightness coefficients (Kk) corresponding to the respective observation methods, a manual correction value (Km) corresponding to the respective observation methods and an inherent brightness coefficients (OB) of the respective objectives, the memory has a light amount ratio table including light amount ratios of different values and combinations of a plurality of ND filters which are realized by the respective light amount ratios, and the memory has a per-optical path light amount ratio table for storing light amount correction values corresponding to respective optical paths set by the optical path controller;

the brightness correction module takes the brightness coefficient (Kk) and manual correction value (Km) corresponding to the designated observation method and the brightness coefficient (OB) of the objective lens used in the designated observation method from the table and the light amount correction value corresponding to the optical path designated by the optical path controller from the per-optical path light amount ratio table, finds the light amount ratio from the taken brightness coefficient (Kk), manual correction value (Km), brightness coefficient (OB) of the objective and light amount correction value, and determines the ND filter combination based on the found light amount ratio.

16. The microscope apparatus according to claim 14, wherein:

the observation optical system comprises a TV image taking site for taking a TV observation image, an optical element for taking the light of the observation image from the direct optical path, and a TV optical path for conducting the light of the observation image which is taken by the optical element from the direct optical path to the TV image taking site;

the optical path controller controls, when a TV optical path is designated from an outside, the optical element to allow the light of the observation image to be incident on the TV image taking site;

the memory has a table for storing a brightness correction value corresponding to the TV optical path; and the brightness correction module takes, when the TV optical path is designated to the optical path controller, a brightness correction value corresponding to the TV optical path from the table, and determines the ND filter combination based on the taken light amount correction value, brightness condition and brightness correction value.

17. The microscope apparatus according to claim 1, wherein:

the observation optical system includes an optical element for taking the light of the observation image corresponding to the object from the observation optical system and a photograph taking optical system for allowing the light of the observation image which is taken by the optical element to be incident thereon;

the photograph taking optical system includes photograph taking device for taking a photograph from the observation image and a light measuring device for measuring the light of the observation image incident on the photograph taking optical system;

the optical system controller includes an exposure calculator for subjecting a light amount of the observation image measured by the light measuring device to processing on the basis of one of a plurality of exposure calculation modes, and a messaging device for informing the photograph taking device of an exposure time which is found by the exposure calculator;

the memory has an observation method kind calculation mode table for storing the exposure calculation modes in correspondence with the respective observation methods; and said microscope apparatus further comprises a device for, when the observation method is designated by the observer, taking the exposure calculation mode corresponding to the designated observation method from the observation method kind calculation mode table, and informing the exposure calculator of the taken exposure calculation mode.

18. The microscope apparatus according to claim 16, wherein:

said cube change unit includes a reflected illumination optical element for bright field reflected illumination, a reflected illumination optical element for dark build reflected illumination, and a reflected illumination optical element for reflected fluorescence illumination; and wherein the reflected illumination optical element for bright field reflected illumination is a full reflecting prism, the reflected illumination optical element for dark field reflected illumination is a light splitting prism, and the reflected illumination optical element for reflected fluorescence illumination is a wave selector.

19. The microscope apparatus according to claim 1, further comprising a correcting device for taking out of the memory the setting condition of the optical elements corresponding to the designated observation method in accordance with an output of the fit determination module, and for preparing an instruction for controlling the optical system controller to correct the setting condition of the optical elements such that the setting condition corresponds to the designated observation method.

20. The microscope apparatus according to claim 11, further comprising a warning module for providing a warning message when the fit determination module determines that the selected objective is unfit for the designated observation method.

21. The microscope apparatus according to claim 11, further comprising an invalidation instruction module for invalidating the selected objective when the fit determination module determines that the selected objective is unfit for the designated observation method.

22. The microscope apparatus according to claim 1, further comprising an objective correcting module for, when the fit determination module determines that the designated observation method is unfit for the selected objective, finding from the table an objective which is fit for the designated observation method, and for preparing an instruction for the frame controller to insert the found objective onto the optical path of the observation optical system.

23. A microscope apparatus comprising:

a light source for generating illumination light;

an illumination optical system for illuminating an object to be observed with the illumination light;

an observation optical system for conducting an observation image of the illuminated object to an observation site;

optical system control means for independently controlling optical elements arranged in the illumination optical system, and for independently controlling optical elements arranged in the observation optical system;

recognition means for recognizing a given one of a plurality of predetermined observation methods which is designated by the observer;

memory means having a table for storing setting conditions of the optical elements corresponding to the respective observation methods; and correcting means for taking from the memory means the setting conditions of the optical elements corresponding to the observation method recognized by the recognition means, and for preparing instruction for the optical system control means to correct the optical elements based on the taken setting conditions;

said observation optical system including an objective change unit, arranged in the observation optical system, for holding a plurality of objectives and for selectively inserting one of the objectives onto an optical path of the observation optical system;

said optical system control means includes frame control means for controlling the objective change unit to insert a given on of the plurality of objectives selected by an observer onto the optical path of the observation optical system;

said memory means includes means for registering, as data of said table, fit/unit information indicating whether or not each of the plurality of objectives is fit for the respective observation methods; and said correcting means includes (i) a fit determination module for when the observation method is designated by the observer, taking the fit/unfit information relating to the designated observation method from the table of the memory means, and for determining whether or not the objective inserted onto the optical path of the observation optical system is fit for the designated observation method based on the taken fit/unfit information, and (ii) an objective correction module for, when the fit determination module determines that the objective is unfit for designated observation method, finding an objective which is fit for the designated observation from the table of the memory means, and for delivering an instruction to the frame control means for inserting the found objective onto the optical path of the observation optical system.

24. The microscope apparatus according to claim 23, wherein the objective change unit includes a revolver, and the fit/unfit information includes at least a type and a magnification of each of the objectives and an indication as to whether or not each of the objectives is fit for the respective observation methods.

* * * * *